United States Patent
Obayashi et al.

(10) Patent No.: US 10,958,796 B2
(45) Date of Patent: Mar. 23, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masaaki Obayashi, Kawasaki (JP); Hiroyasu Kunieda, Yokohama (JP); Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 16/373,778

(22) Filed: Apr. 3, 2019

(65) Prior Publication Data
US 2019/0327367 A1 Oct. 24, 2019

(30) Foreign Application Priority Data
Apr. 23, 2018 (JP) .............................. JP2018-082563

(51) Int. Cl.
G06F 9/30 (2018.01)
H04N 1/00 (2006.01)

(52) U.S. Cl.
CPC ....... *H04N 1/00196* (2013.01); *G06F 9/3004* (2013.01); *H04N 1/00167* (2013.01)

(58) Field of Classification Search
CPC ............ H04N 1/00196; H04N 1/00167; G06F 9/3004
USPC ....................................................... 382/284
See application file for complete search history.

(56) References Cited

U.S. PATENT DOCUMENTS

| | | | |
|---|---|---|---|
| 8,620,105 B2 | 12/2013 | Hori et al. | |
| 9,420,121 B2 * | 8/2016 | Grosz | G06F 3/1287 |
| 10,013,395 B2 | 7/2018 | Kajiwara et al. | |
| 2005/0134933 A1 * | 6/2005 | Tsue | H04N 1/00456 358/437 |
| 2010/0164992 A1 * | 7/2010 | Akiya | H04N 1/00456 345/641 |
| 2012/0294514 A1 * | 11/2012 | Saunders | G06K 9/00677 382/159 |
| 2013/0004073 A1 * | 1/2013 | Yamaji | H04N 1/00196 382/173 |
| 2017/0039746 A1 | 2/2017 | Mizoguchi et al. | |

(Continued)

FOREIGN PATENT DOCUMENTS

JP 2017-199961 A 11/2017

*Primary Examiner* — Ali Bayat
(74) *Attorney, Agent, or Firm* — Venable LLP

(57) ABSTRACT

An image processing apparatus includes a first determination unit configured to determine a group of candidate templates usable for a processing target double-page spread in accordance with the number of images allocated to the processing target double-page spread, a second determination unit configured to determine a determination condition for determining whether a template already used and a template included in the group of candidate templates are similar, on the basis of the number of images or the number of templates, a third determination unit configured to determine a to-be-used template to be used for the processing target double-page spread from among the templates excluding any template determined as a similar template with the determination condition, and a layout unit configured to lay out the images allocated to the processing target double-page spread on the to-be-used template.

19 Claims, 14 Drawing Sheets

(56) References Cited

U.S. PATENT DOCUMENTS

| | | |
|---|---|---|
| 2018/0167521 A1 | 6/2018 | Iguchi et al. |
| 2018/0268520 A1 | 9/2018 | Kunieda et al. |
| 2019/0012820 A1 | 1/2019 | Furuya |

* cited by examiner

| IMAGE ID | IMAGE CAPTURE DATE AND TIME | FOCUS | NUMBER OF FACES | PERSONAL ID | | | | | | | OBJECT |
|---|---|---|---|---|---|---|---|---|---|---|---|
| | | | | 1 | | 2 | | 3 | | ... | |
| | | | | UPPER LEFT POSITION | LOWER RIGHT POSITION | UPPER LEFT POSITION | LOWER RIGHT POSITION | UPPER LEFT POSITION | LOWER RIGHT POSITION | ... | |
| 1 | 2015/7/1 10h11m12s | GOOD | 6 | 40,40 | 65,65 | 90,40 | 115,65 | 10,20 | 25,35 | ... | PERSON |
| 2 | 2015/7/1 10h12m30s | GOOD | 2 | 50,100 | 100,150 | 150,150 | 190,165 | - | - | ... | PERSON |
| 3 | 2015/7/1 10h15m54s | GOOD | 0 | - | - | - | - | - | - | ... | FLOWER |
| ... | ... | ... | ... | ... | ... | ... | ... | ... | ... | ... | ... |

FIG.5

| SCENE TYPE | IMAGE CAPTURE PERIOD (HOUR) | | NUMBER OF IMAGES CAPTURED | | NUMBER OF PERSONS CAPTURED IN IMAGES | |
|---|---|---|---|---|---|---|
| | MEAN | STANDARD DEVIATION | MEAN | STANDARD DEVIATION | MEAN | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

| SCENE TYPE | FEATURES OF MAIN SLOT IMAGE | FEATURES OF SUB SLOT IMAGE |
|---|---|---|
| TRIP | DISTANT IMAGE OF PERSONS AND SCENERY | IMAGE OF CLOSE-UP OR PROFILE |
| DAILY LIFE | IMAGE OF CLOSE-UP OR PROFILE | DISTANT IMAGE OF PERSONS AND SCENERY |
| CEREMONY | IMAGE OF TWO PERSONS CLOSE IN DISTANCE TO EACH OTHER | IMAGE OF MANY PEOPLE |

FIG.9B

| IMAGE ID | SCORE (OUT OF 50 POINTS) | |
|---|---|---|
| | MAIN SLOT (POINTS) | SUB SLOT (POINTS) |
| 1 | 20 | 40 |
| 2 | 45 | 10 |
| 3 | 10 | 20 |
| ... | ... | ... |

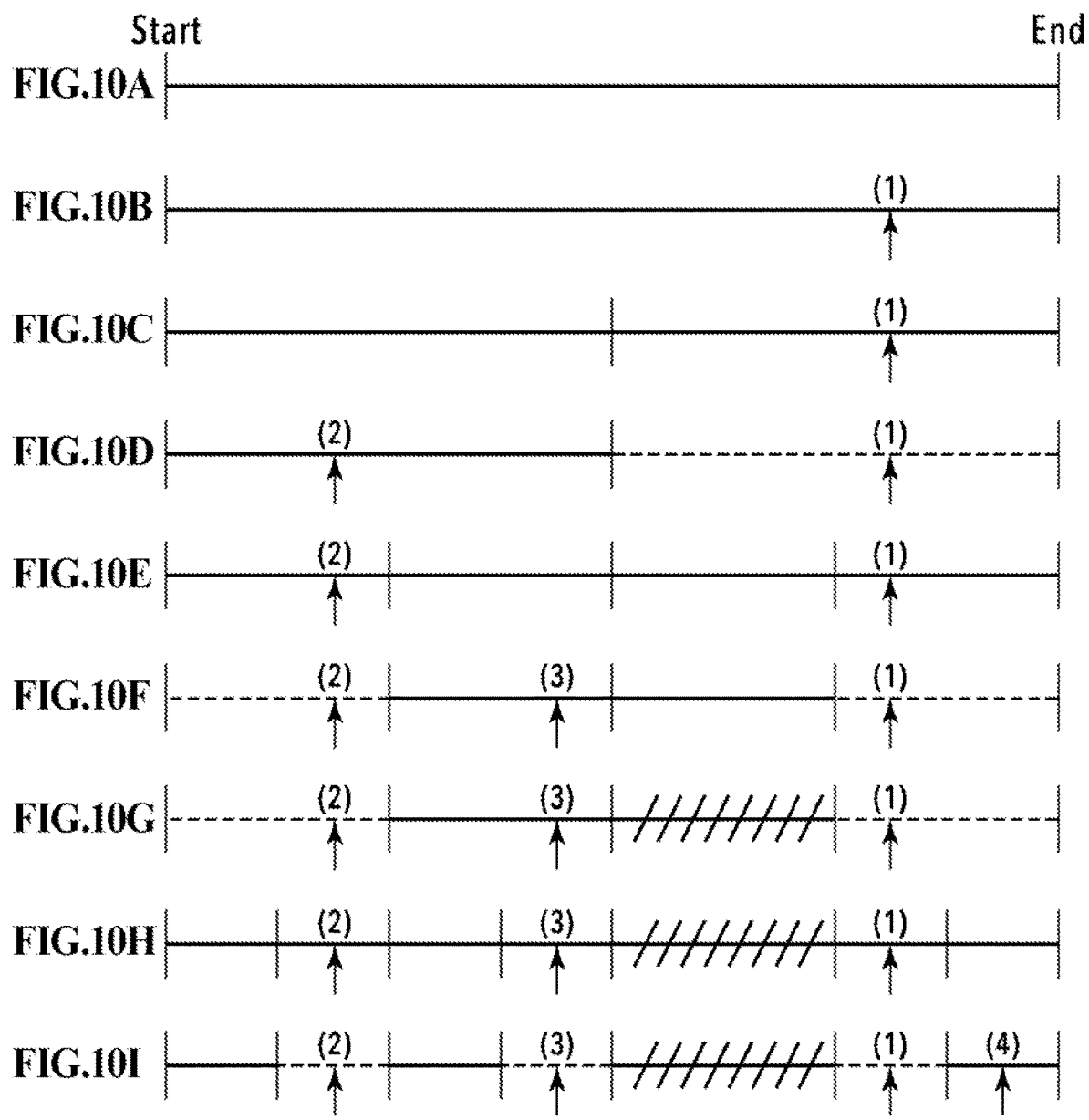

IMAGE PROCESSING APPARATUS, IMAGE PROCESSING METHOD, AND STORAGE MEDIUM

This application claims the benefit of Japanese Patent Application No. 2018-082563, filed Apr. 23, 2018, which is hereby incorporated by reference herein in its entirety.

BACKGROUND OF THE INVENTION

Field of the Invention

The present invention relates to a technique for laying images out on double-page spreads.

Description of the Related Art

There are techniques for automatically creating a photo album. In creating a photo album, an automatic layout process is performed in which one or more images are automatically arranged on each double-page spread in accordance with a predetermined template.

In a case when the templates used for double-page spreads are uniform, the album created is monotonous and repetitive. Japanese Patent Laid-Open No. 2017-199961 (hereafter, the '961 document) discloses a technique that controls at least one of template selection and image selection so as to provide regular variability across double-page spreads.

To create varied layouts, it is preferable to, for example, to select a template not similar to the template used for a first double-page spread as the template for a second double-page spread. In the '961 document, however, changing the method of determining the similarity is not taken into consideration.

SUMMARY OF THE INVENTION

An image processing apparatus according to an aspect of the present invention comprises an obtaining unit configured to obtain a plurality of images. an allocating unit configured to allocate at least one image to each of double-page spreads out of the obtained images. a first determination unit configured to determine a group of candidate templates usable for a processing target double-page spread in accordance with the number of images allocated to the processing target double-page spread, a second determination unit configured to determine a determination condition for determining whether a template already used for layout and a template included in the determined group of candidate templates are similar, on a basis of the number of images allocated to the processing target double-page spread or the number of templates included in the determined group of candidate templates, a third determination unit configured to determine a to-be-used template to be used for the processing target double-page spread from among the templates included in the group of candidate templates and excluding any template determined as a similar template with the determination condition, and a layout unit configured to lay out the at least one image allocated to the processing target double-page spread on the to-be-used template.

Further features of the present invention will become apparent from the following description of exemplary embodiments with reference to the attached drawings.

BRIEF DESCRIPTION OF THE DRAWINGS

FIG. 5 is a diagram listing analysis information on images.

FIG. 7 is a diagram listing means and standard deviations for each of scene types.

FIGS. 9A and 9B are diagrams explaining an overview of scoring.

FIGS. 10A to 10I are diagrams explaining selection of images.

DESCRIPTION OF THE EMBODIMENTS

Figure 1:
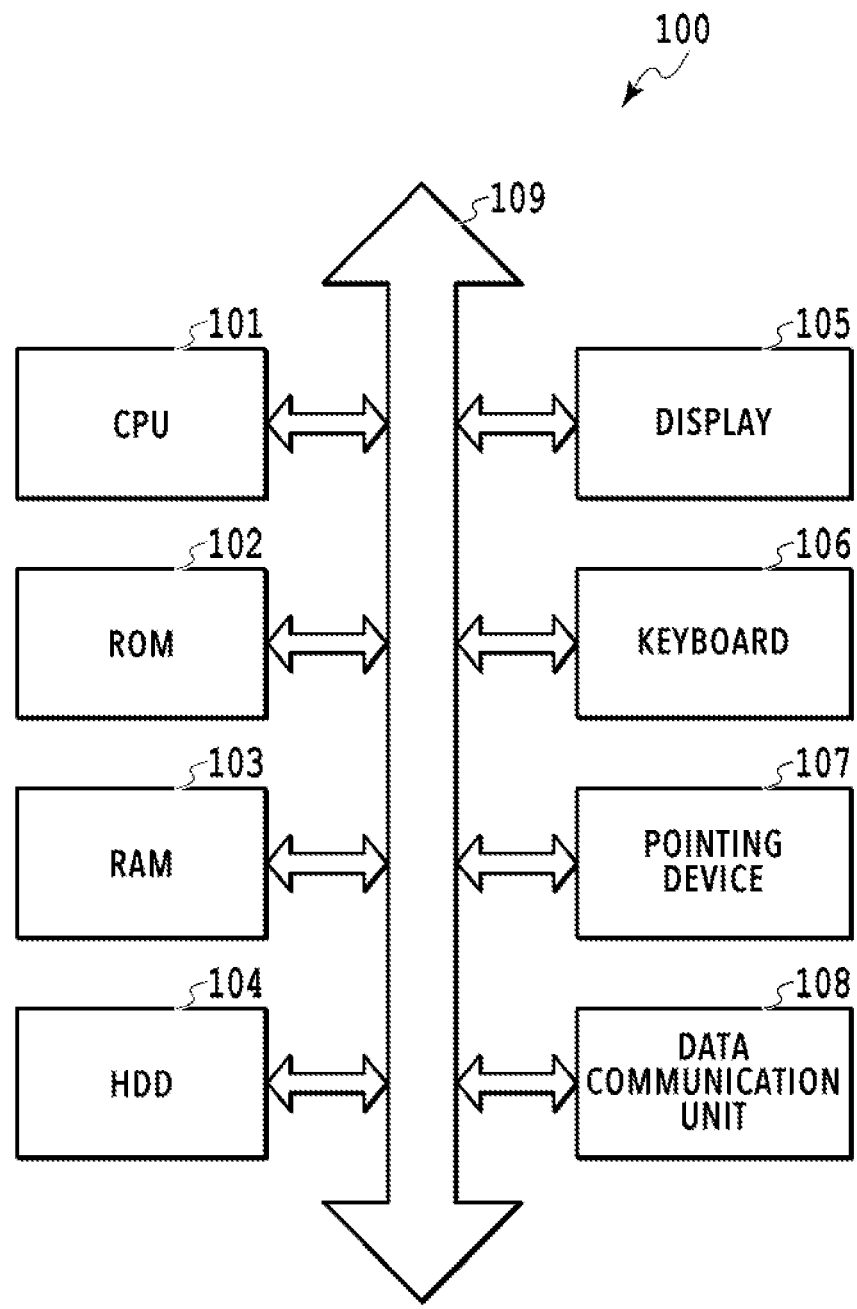
FIG. 1 is a block diagram illustrating the hardware configuration of an image processing apparatus.

Embodiments of the present invention will be specifically described with reference to the accompanying drawings. Note that the following embodiments do not limit the present invention according to the claims, and not all of the combinations of the features described in these embodiments are necessarily essential for a solution provided by the present invention. Meanwhile, identical constituent components will be denoted by the same reference numeral, and a description thereof will be omitted.

Embodiment 1

In this embodiment, a description will be given of a process involving running an album creation application on an image processing apparatus to create a layout of each double-page spread in an album with an automatic layout function. A description will also be given of a process involving properly determining the similarity between templates to provide a varied layout result.

<Hardware Configuration>

FIG. 1 is a block diagram illustrating the hardware configuration of an image processing apparatus 100. Note that examples of the image processing apparatus 100 include a personal computer (PC), a smartphone, a tablet, and so on. In this embodiment, the image processing apparatus 100 is a PC. A central processing unit (CPU/processor) 101 takes overall control of the image processing apparatus 100. For example, the CPU 101 reads out a program stored in an ROM 102 into an RAM 103 and executes it to implement operation in this embodiment. Although there is a single CPU 101 in FIG. 1, the image processing apparatus 100 may include a plurality of CPUs. The ROM 102 is a general-purpose ROM and stores a program to be executed by the CPU 101, for example. The RAM 103 is a general-purpose RAM and is used as a working memory for temporarily storing various pieces of information during execution of the program by the CPU 101, for example. A hard disk drive (HDD) 104 is a storage medium (storage unit) that stores a database holding image files, the results of image analyses, and so on, templates to be used by the album creation application, and so on. A display 105 displays user interfaces (UIs), image layout results, and so on to the user. A keyboard 106 and a pointing device 107 receive instruction operations from the user. The display 105 may be equipped with the function of a touch sensor. The keyboard 106 is used by the user, for example, to enter a desired number of double-page spreads to be created in an album into an UI displayed on the display 105. The pointing device 107 is used by the user, for example, to click a button on a UI displayed on the display 105.

A data communication unit 108 performs communication with an external apparatus through a wired or wireless network. For example, the data communication unit 108 transmits pieces of data laid out by the automatic layout function to a printer or server that can communicate with the image processing apparatus 100. A data bus 109 connects the blocks in FIG. 1 communicatively to each other. Note that the pieces of data laid out will be printed by the printer.

The album creation application in this embodiment is stored in the HDD 104 and is started upon a double-click on the application's icon displayed on the display 105 by the user with the pointing device 107.

<Configuration of Album Creation Application>

Figure 2:
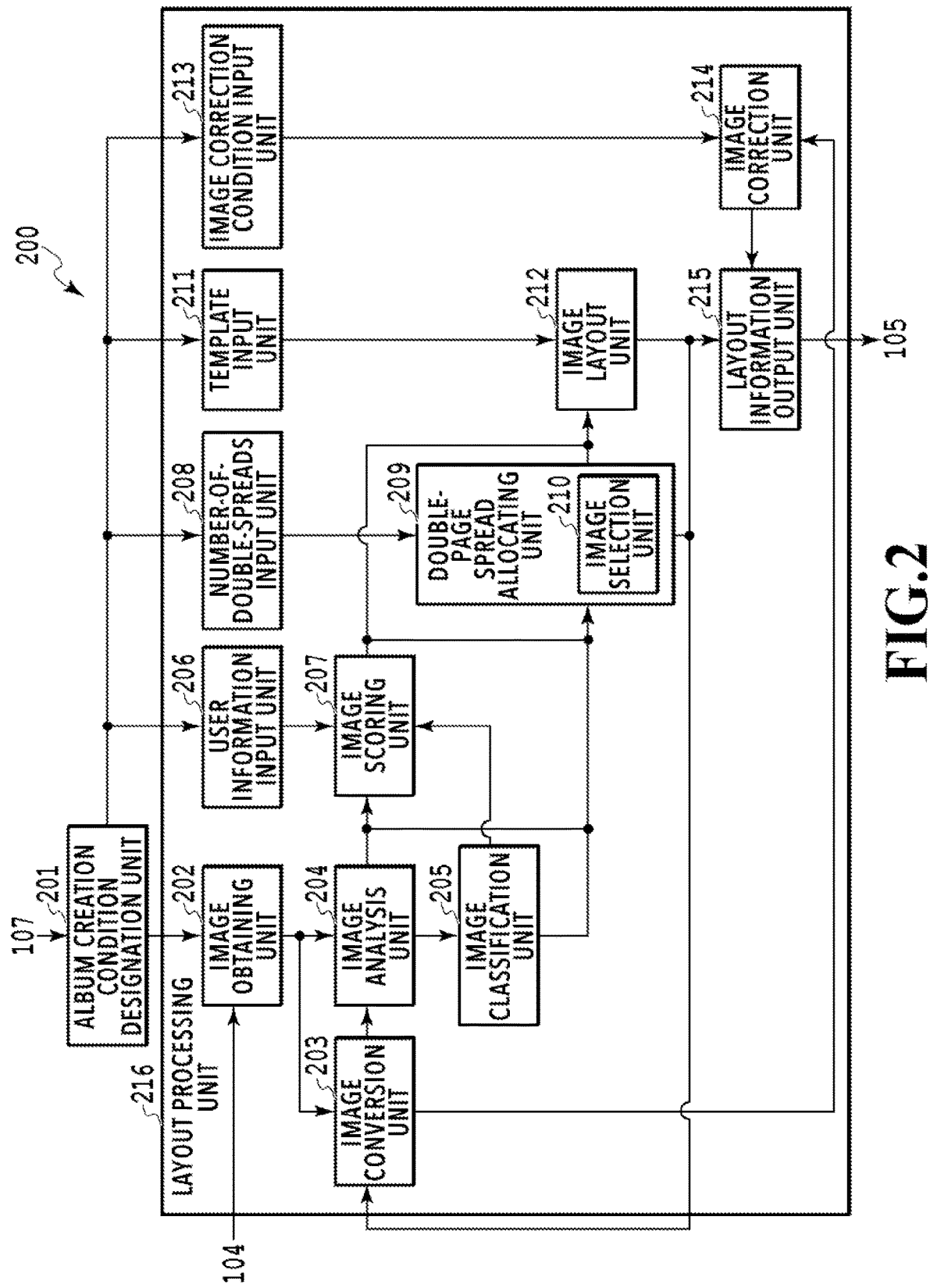
FIG. 2 is a software block diagram of an album creation application.

FIG. 2 is a software block diagram of an album creation application 200. After the album creation application 200 is installed in the image processing apparatus 100, its start icon is displayed on the top screen (desktop) of the operating system (OS) running on the image processing apparatus 100. Upon a double-click on the start icon, displayed on the display 105, by the user with the pointing device 107, the program of the album creation application stored in the HDD 104 is loaded to the ROM 102. As the CPU 101 reads out the program in the ROM 102 and executes it, the album creation application 200 is started and the CPU 101 functions as each block illustrated in FIG. 2.

An album creation condition designation unit 201 outputs to a layout processing unit 216 album creation conditions corresponding to the user's UI operation with the pointing device 107. The album creation conditions include, for example, designation of a group of image data to be used in the album creation, designation of the number of double-page spreads, designation of user information, designation of the template design, designation of an image correction condition, and so on.

Figure 3:
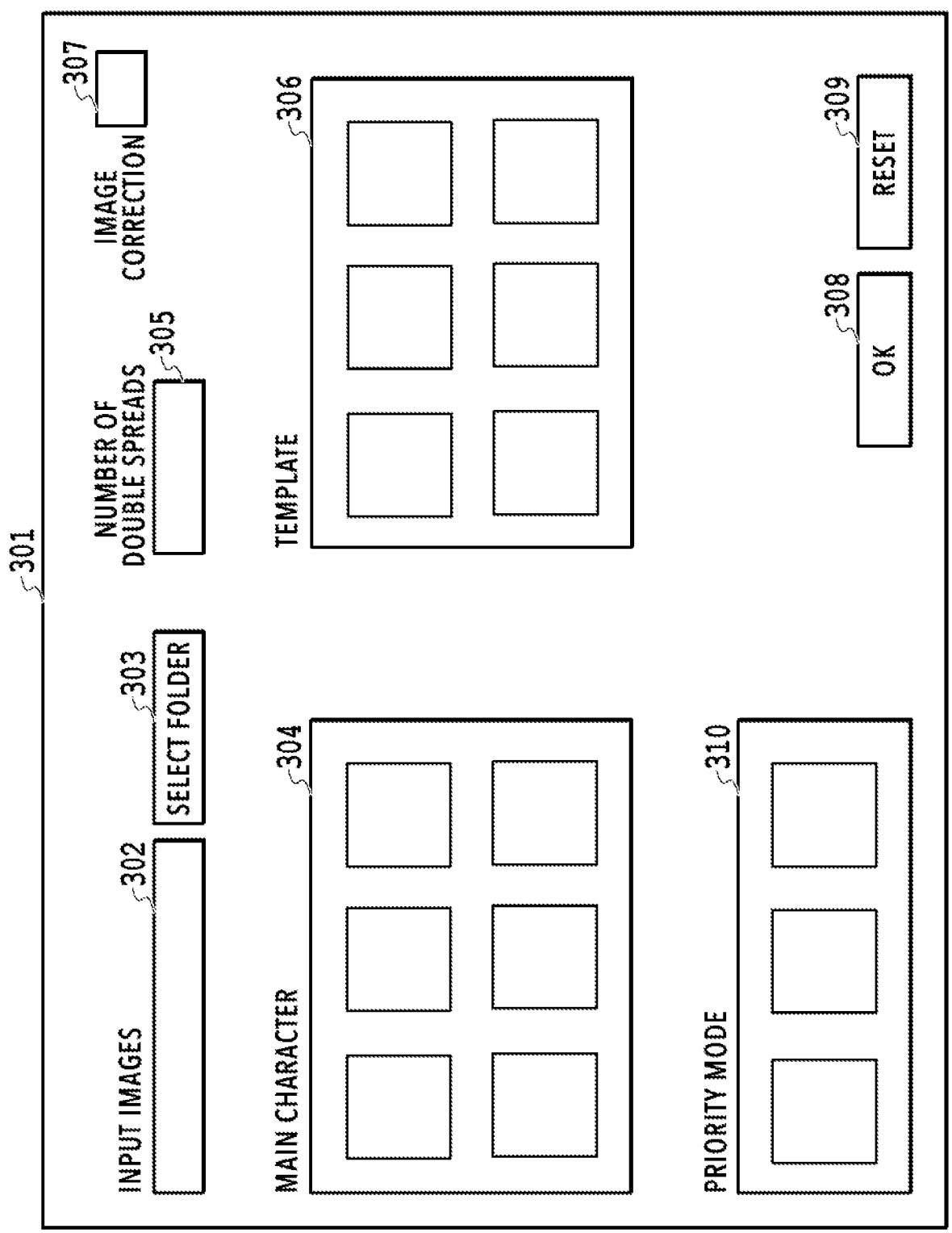
FIG. 3 is a diagram illustrating a display screen provided by the album creation application.

FIG. 3 is a diagram illustrating an example of a display screen 301 provided by the album creation application 200. The album creation condition designation unit 201, for example, obtains various conditions designated by the user through the display screen 301, illustrated in FIG. 3, and outputs them as the album creation conditions.

The display screen 301 is a screen displayed on the display 105. The user designates the album creation conditions through the display screen 301. A path box 302 on the display screen 301 displays the location (path) in the HDD 104 in which is stored the group of image data for the album creation. As the user presses a folder selection button 303 with a click operation using the pointing device 107, folders containing groups of image data usable in the album creation are displayed in a tree configuration in a user selectable manner. The folder path 302 displays the path to the folder containing a group of image data selected by the user. In the described example of FIG. 3, the group of image data for the album creation is designated by selecting its folder. However, the present embodiment is not limited to this case. All images in the HDD 104 or the images in a designated folder in the HDD 104 may be thumbnailed, and images individually designated by the user may be determined as the group of image data for the album creation. Note that in a case when the user individually selects images, all of the selected images may be used in the album.

A main character designation icon 304 is an icon for the user to designate one or more main characters. In the main character designation icon 304 are displayed facial images of persons as icons. Icons with different facial images are displayed side by side in the main character designation icon 304. The user can select a desired main character designation icon by clicking it with the pointing device 107. A number-of-double-spreads box 305 is a UI for receiving setting of the number of double-page spreads in an album from the user. The user directly enters a number into the number-of-double-spreads box 305 with the keyboard 106 or enters a number into the number-of-double-spreads box 305 from a list with the pointing device 107.

A template designation icon 306 is a UI for receiving a type of template design from the user. In the template designation icon 306 are displayed images with illustrations of different template styles (pop style, chic style, etc.). A plurality of template icons are displayed side by side in the template designation icon 306. The user can select a desired template icon by clicking it with the pointing device 107. In this embodiment, a single template is used for layout of a single double-page spread. Each template contains one or more image arrangement frames (slots) in which to arrange an image. A set of first-design templates is formed of groups of templates. For example, the set of first-design templates includes groups of templates classified by the number of image slots, such as a first group of templates with one image slot and a second group of templates with two image slots. This also applies to sets of templates with other designs.

A checkbox 307 is a UI for receiving designation of on/off of image correction from the user. In a state when the checkbox 307 is checked, the image correction is designated to be on. In the state when the checkbox 307 is unchecked, the image correction is designated to be off. A priority mode designation icon 310 is an icon for the user to designate a mode to be preferentially used. In the priority mode designation icon 310 are displayed icons of, for example, a person, a pet, and a flower. The user can select a desired priority mode designation icon by clicking it with the pointing device 107.

As the user presses an OK button 308, the album creation condition designation unit 201 obtains the designated contents on the display screen 301 as album creation conditions set by the user. The album creation condition designation unit 201 outputs the obtained album creation conditions to the layout processing unit 216 of the album creation application 200. A reset button 309 on the display screen 301 is a button for resetting all setting information on the display screen 301.

The layout processing unit 216 is a processing unit that implements the automatic layout function. The layout processing unit 216 includes an image obtaining unit 202, an image conversion unit 203, an image analysis unit 204, an image classification unit 205, a user information input unit 206, an image scoring unit 207, a number-of-double-spreads input unit 208, a double-page spread allocating unit 209, and an image selection unit 210. The layout processing unit 216 further includes a template input unit 211, an image layout unit 212, an image correction condition input unit 213, an image correction unit 214, and a layout information output unit 215.

The album creation conditions designated on the display screen 301 in FIG. 3 are transferred to the corresponding units in the layout processing unit 216. Specifically, the path entered in the path box 302 is transferred to the image obtaining unit 202. A personal ID of the main character selected in the main character designation icon 304 is transferred to the user information input unit 206. The number of double-page spreads entered in the number-of-double-spreads box 305 is transferred to the number-of-double-spreads input unit 208. The template information selected in the template designation icon 306 is transferred to the template input unit 211. The designation of on/off of the image correction in the image correction checkbox 307 is transferred to the image correction condition input unit 213.

Next, a process by each unit in the layout processing unit 216 will be described. The image obtaining unit 202 obtains the group of image data designated by the album creation condition designation unit 201 from the HDD 104. The image conversion unit 203 converts each piece of image data in the group of image data obtained by the image obtaining unit 202 into a piece of image data having a desired number of pixels and a desired type of color information. In this embodiment, the image conversion unit 203 converts each piece of image data into a piece of image data having 420 pixels along each short side and sRGB color information (hereafter referred to as "analysis image data").

The image analysis unit 204 executes processes on the analysis image data such as obtaining of a feature amount, face detection, facial expression recognition, personal recognition, and object recognition, and obtains information on the results of these processes. Also, the image analysis unit 204 obtains data attached to each piece of image data obtained from the HDD 104, e.g., obtains the image capture date and time from its Exif information. The pieces of information obtained by the image analysis unit 204 will be collectively referred to as "analysis information".

The image classification unit 205 executes scene division and scene type classification on the group of image data obtained by the image obtaining unit 202 by using the analysis information obtained by the image analysis unit 204 (e.g., the image capture date and time information, the number of images captured, information on the faces detected, etc.). "Scene" refers to the scene in which an image was captured. The scene division refers to dividing the group of image data into sub image groups by scene. The scene type classification refers to classifying the sub image groups by scene type. For example, scenes may be classified as scene types such as trip, daily life, and wedding ceremony. Scenes of the same scene type may be classified as different scenes in a case when, for example, their image capture dates or times are different. Note that, in this embodiment, as will be described later, a single scene (i.e., a single sub image group) corresponds to a single double-page spread. Details will be described later.

The image scoring unit 207 scores each piece of image data in the group of image data such that an image suitable for the layout is given a high score. For example, the image scoring unit 207 scores each piece of image data by using user information and a priority mode inputted into the user information input unit 206, the analysis information obtained by the image analysis unit 204, and the information obtained by the image classification unit 205. Details will be described later.

The user information input unit 206 inputs the ID (identification information) of the main character designated by the album creation condition designation unit 201 into the image scoring unit 207. The image scoring unit 207 is configured to give a higher score to a piece of image data containing the main character's ID inputted from the user information input unit 206. The user information input unit 206 also inputs the priority mode designated by the album creation condition designation unit 201 into the image scoring unit 207. The image scoring unit 207 is configured to give a higher score to a piece of image data containing at least one object specified in the designated priority mode.

The number-of-double-spreads input unit 208 inputs the number of double-page spreads in the album designated by the album creation condition designation unit 201 into the double-page spread allocating unit 209. In this embodiment, a template is set for each double-page spread. A single double-page spread corresponds to two pages in the state where the album is created. In the created album, a single double-page spread is divided into two upper and lower pages or two right and left pages by the binding part of the double spread.

The double-page spread allocating unit 209 divides the group of image data on the basis of the number of double-page spreads inputted into the number-of-double-spreads input unit 208 and allocates each image contained in the group of image data to one of the double-page spreads. The double-page spread allocating unit 209, if necessary, makes an adjustment, and allocates the images to the double-page spreads by referring to the result of the classification by the image classification unit 205 and the scores given by the image scoring unit 207. For example, the image classification unit 205 divides the group of image data into sub image groups by scene. In a case when the number of double-page spreads and the number of divided scenes do not match, the double-page spread allocating unit 209 performs a process of matching the number of double-page spreads and the number of scenes via adjustment of the scene division method, or the like. In other words, the double-page spread allocating unit 209 makes an adjustment such that a single scene corresponds to a single double-page spread. Thus, each image contained in the group of image data belongs to one of the scenes and is a candidate image that may be arranged on one of the double-page spreads. As described above, the double-page spread allocating unit 209 allocates each image in the group of image data to one of the double-page spreads.

The double-page spread allocating unit 209 includes the image selection unit 210. The image selection unit 210 selects the one or more images to be arranged on the processing target double-page spread from the sub image group allocated to the processing target double-page spread by the double-page spread allocating unit 209 on the basis of the scores given by the image scoring unit 207. For example, in a case when the number of images allocated by the double-page spread allocating unit 209 is more than the number of images to be used set for the double-page spread, the image selection unit 210 selects as many images as the set number of images to be used from the sub image group. The number of images to be used set for each double-page spread may be designated by the album creation condition designation unit 201. For example, the user may, in advance, designate the number of images to be used for each double-page spread or designate that a rather large or small number of images are to be used for each double-page spread. Alternatively, the number of images to be used for each double-page spread may be determined in accordance with the result of the classification by the image classification unit 205, the scores given by the image scoring unit 207, and so on. The number of images to be used for each double-page spread may be determined by using the number of images allocated to each double-page spread by the double-page spread allocating unit 209, the distribution of the scores of the images, the trend of template design, and various other types of information. The number of images to be used for each double-page spread may be set by other methods.

The template input unit 211 inputs the groups of templates corresponding to the template information designated by the album creation condition designation unit 201 into the image layout unit 212.

The image layout unit 212 determines the image layout of each double-page spread in the album. The image layout unit 212 selects a template suitable for the one or more images allocated by the double-page spread allocating unit 209 (and selected by the image selection unit 210) from among the plurality of templates inputted from the template input unit 211 to determine the layout. For example, assume a case when the number of images to be used set for a first double-page spread is one, that is, a case when the number of images allocated to the first double-page spread is one. In this case, the image layout unit 212 determines a template from the group of one-image templates inputted from the template input unit 211. In a case when the number of images allocated to the first double-page spread is three, the image layout unit 212 determines a template suitable for the images allocated by the double-page spread allocating unit 209 (and selected by the image selection unit 210) from the inputted group of three-image templates.

The layout information output unit 215 outputs layout information to be displayed on the display 105 in accordance with the layout determined by the image layout unit 212. The layout information is, for example, bitmap data of the selected template with the image data selected by the image selection unit 210 laid out thereon. The layout information may be transferred to an external printer through the data communication unit 108.

The image correction condition input unit 213 inputs the on/off condition of image correction designated by the album creation condition designation unit 201 into the image correction unit 214. The image correction unit 214 executes at least one of dodging correction (luminance correction), red-eye correction, and contrast correction. The image correction unit 214 executes the correction on the image data in the case when the image correction condition is on, and execute no correction in the case when the image correction is off. Note that the image correction unit 214 executes the correction on the image data inputted from the image conversion unit 203 on the basis of the on/off of the correction. The number of pixels of the image data inputted into the image correction unit 214 from the image conversion unit 203 can be changed to match the size in the layout determined by the image layout unit 212.

<Flow of Layout Process>

Figure 4:
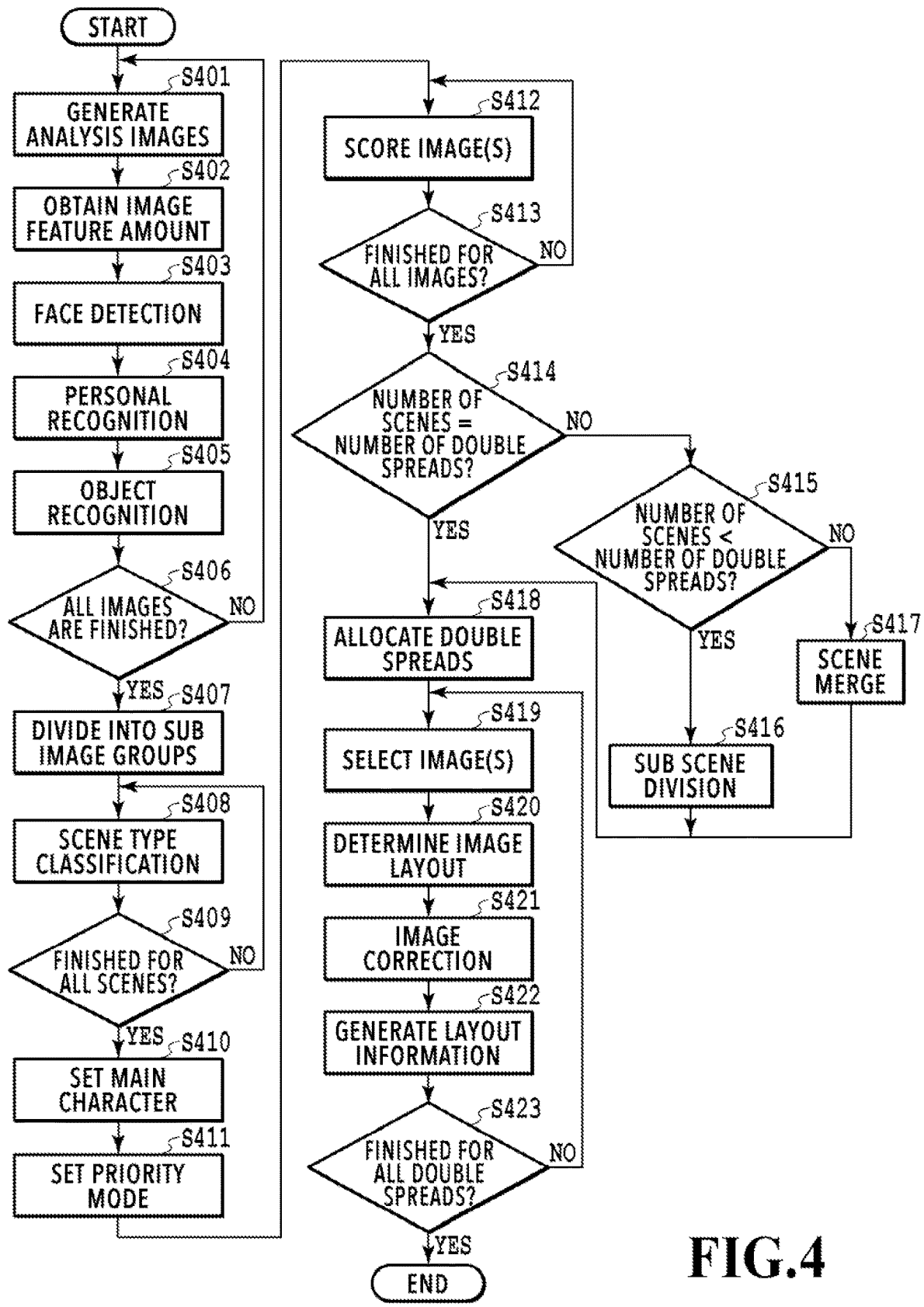
FIG. 4 is a flowchart illustrating a layout process.

FIG. 4 is a flowchart illustrating the process by the layout processing unit of the album creation application 200. The flowchart illustrated in FIG. 4 is implemented as the CPU 101 reads out and executes a program stored in the HDD 104 or the ROM 102, for example. Alternatively, the functions of some or all of the steps in FIG. 4 may be implemented with hardware such as an ASIC or an electronic circuit. Meanwhile, the symbol "S" in the description of each process means a step in the flowchart.

In S401, the image conversion unit 203 generates analysis image data. The image conversion unit 203 converts a piece of image data in a group of image data obtained by the image obtaining unit 202 into analysis image data having a desired number of pixels and a desired type of color information. In this embodiment, the image conversion unit 203 converts a piece of image data into analysis image data having 420 pixels along each short side and sRGB color information.

In S402, the image analysis unit 204 obtains an image feature amount. The image analysis unit 204 obtains the image capture date and time of the piece of image data obtained by the image obtaining unit 202 from, for example, its Exif information attached to the piece of image data. Moreover, the image analysis unit 204 obtains a feature amount in the analysis image data generated in S401. The feature amount is, for example, a focus amount. The Sobel filter has been widely known as an edge detection method. The Sobel filter may be used to detect edges, and the difference in luminance between the start and the end of each edge may be divided by the distance between the start and the end to calculate the gradient of the edge. By calculating the mean gradient of the edges in the image, an image with a large mean gradient can be determined to be in sharper focus than an image with a small mean gradient. Then, a plurality of gradient thresholds may be set, which are different values. By determining which one of thresholds the gradient is at or above, it is possible to determine the focus amount. In this embodiment, two different thresholds are set in advance. For example, a gradient at or above a first threshold may be determined as a degree of focus desired to be used in the album (GOOD); a gradient below the first threshold and at or above a second threshold may be determined as an acceptable degree of focus (NORMAL); and a gradient below the second threshold may be determined as an unacceptable degree of focus (BAD). Each threshold can be, for example, provided by the creator of the album creation application 200, or the like, or set on a UI.

In S403, the image analysis unit 204 executes face detection on the analysis image data generated in S401. Here, publicly known methods are usable for the face detection process. For example, AdaBoost, which creates a strong classifier from a plurality of prepared weak classifiers, can be used. In this embodiment, a strong classifier created by AdaBoost is used to detect facial images of persons (objects). The image analysis unit 204 extracts each facial image and obtains the upper left coordinate value and the lower right coordinate value of the position of the detected facial image. With these two sets of coordinates, the image analysis unit 204 can obtain the position and size of the facial image.

In S404, the image analysis unit 204 performs personal recognition by comparing the degrees of similarity of the facial image detected in S403 to representative facial images stored in association with personal IDs in a face dictionary database. The image analysis unit 204 determines the ID whose similarity is higher than or equal to a threshold and is the highest as an ID of the detected facial image. Note that in a case when the similarity is lower than the threshold, the image analysis unit 204 registers the detected facial image as a new face with a new personal ID in the face dictionary database. The face dictionary database is provided in the album creation application 200.

In S405, the image analysis unit 204 executes object recognition on the analysis image data generated in S401. Here, publicly known methods are usable for the object recognition process. In this embodiment, a classifier created by deep learning is used to recognize objects. By recognizing object images, the image analysis unit 204 can obtain types of objects, such as a person, a pet, such as a dog and a cat, a flower, food, a building, and a stationary article.

FIG. 5 is a diagram listing the pieces of analysis information on some images. As illustrated in FIG. 5, the image analysis unit 204 stores the pieces of analysis information obtained in S402 to S405 in a storage region such as the RAM 103 individually for each ID identifying an image. For example, as illustrated in FIG. 5, the image capture date and time information and the result of the determination on the focus obtained in S402, the information on the number and positions of facial images detected in S403, and the type of each object recognized in S405 are stored in a table format. Note that the information on the positions of the facial images is stored individually for each personal ID obtained in S404.

In S406, the album creation application 200 determines whether the processes in S401 to S405 have been finished for all pieces of image data in the group of image data obtained by the image obtaining unit 202. If the processes have been finished for all, the processes from S401 are repeated. If the processes have not been finished for all, the flow proceeds to S407.

Figure 6A:
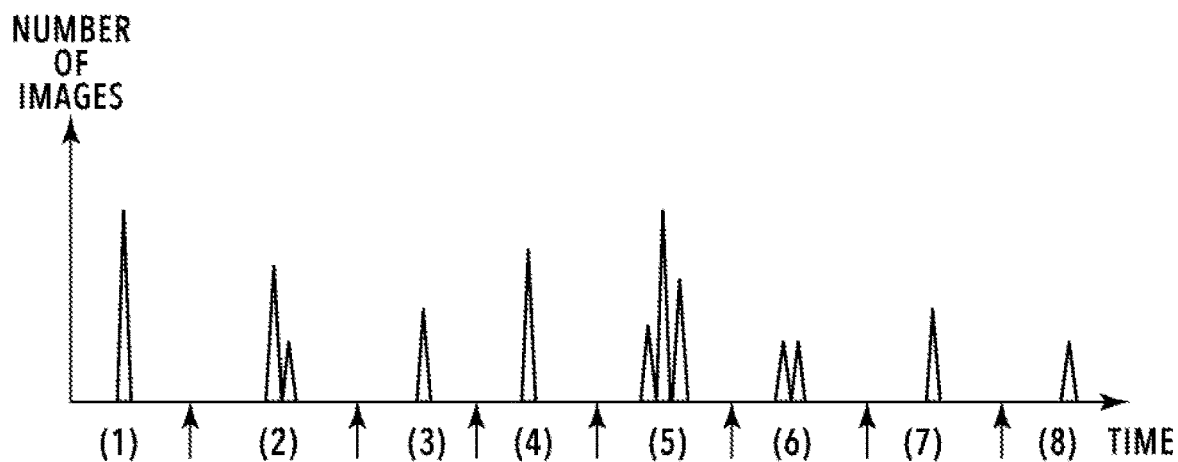
FIGS. 6A to 6C are diagrams illustrating the result of scene division on a group of image data.

In S407, the image classification unit 205 executes the scene division. The image classification unit 205 divides the group of image data obtained by the image obtaining unit 202 into a plurality of scenes on the basis of the differences in image capture time between the images calculated from their image capture dates and times information obtained in S402. Specifically, the image classification unit 205 divides the group of image data into a plurality of sub image groups. In this embodiment, in a case, for example, when there are one or more days with no image captured between pieces of image data, the group of image data is divided at that part. The group of image data may be divided at a different part. For example, in a case of dividing a group of image data captured on successive days, if there is a time interval of sixteen hours between pieces of image data, the group of image data may be divided at that part. Also, in a case when the time interval is less than sixteen hours, the group of image data is still divided at that part if the time interval between the first image capture and the last image capture in each of the successive days is less than four hours. If the time interval between the first image capture and the last image capture is equal to or more than four hours, the group of image data is divided at the above part on a condition that the number of images captured on each of successive days is less than fifty, and is not divided on a condition that the number of images captured is more than or equal to fifty. FIG. 6A is a diagram illustrating an example of the result of dividing a group of image data into eight sub image groups by the above scene division method.

In S408, the image classification unit 205 executes the scene type classification. In this embodiment, the image classification unit 205 classifies each sub image group, obtained by the scene division, into one of scene types of trip, daily life, and ceremony. The three scene types are presented here as an example for the sake of description, and the scene types are not limited to those.

This embodiment assumes that the user has, in advance, designated pieces of image data that the user has determined to belong to the scene types of trip, daily life, and ceremony, and the album creation application 200 has figured out feature amounts in each scene. For example, prior to the execution of the layout process in FIG. 4, the album creation condition designation unit 201 receives designation of pieces of image data that the user has determined as trip scenes on a UI screen (not illustrated). The image analysis unit 204 then obtains the feature amounts in those pieces of image data. The feature amounts obtained here are, for example, the image capture period, the number of images captured, and the number of people captured in the images. The image capture period is the time interval between the first captured piece of image data and the last captured piece of image data among the designated pieces of image data. The number of images captured is the number of captured pieces of image data designated. The number of people captured in the images is the number of faces captured in the images. Thus, the image analysis unit 204 obtains these feature amounts, namely, the image capture period, the number of images captured, and the number of people captured in the images, in the group of images formed of the pieces of image data that the user has determined as trip scenes. On the basis of the feature amounts obtained from groups of such pieces of image data, the image analysis unit 204 calculates the mean and standard deviation of the image capture periods, the mean and standard deviation of the numbers of images captured, and the mean and standard deviation of the numbers of people captured in the images. A similar process is performed for the other scene types.

FIG. 7 illustrates each mean and each standard deviation calculated as above. The image analysis unit 204 stores these values in a storage region such as the ROM 102 in advance. Alternatively, the values may be incorporated in the program of the album creation application 200 in advance.

Returning to the description of S408 in FIG. 4, in S408, the image classification unit 205 calculates a score for each of the feature amounts, namely, the image capture period, the number of images captured, and the number of people captured in the images, in each sub image group, obtained by the scene division. The image classification unit 205 calculates the scores for the image capture period, the number of images captured, and the number of people captured in the images in each sub image group from equation (1) by using the respective means and standard deviations for each scene type listed in FIG. 7.

$$\text{Point}=50-|10\times(\text{Mean}-\text{Feature Amount})/\text{Standard Deviation}| \qquad \text{Equation (1)}$$

Further, the image classification unit 205 calculates a mean score from the scores of each sub image group for the image capture period, the score for the number of images captured, and the score for the number of people captured from equation (2).

$$\text{Mean score}=(\text{Score for Image Capture Period}+\text{Score for Number of Images Captured}+\text{Score for Number of People Captured in Images})/\text{Number of Types of Feature Amounts} \qquad \text{Equation (2)}$$

By the calculation, a mean score is calculated for each sub image group for each of the scene types of trip, daily life, and ceremony. The image classification unit 205 classifies each sub image group as images of the scene type having the highest mean score among the three scene types. Here, in a case when a plurality of scene types have the same score, the sub image group will be classified in accordance with a predefined order of priority for the scene types. For example, in this embodiment, the order of priority is defined as daily life>ceremony>trip, and daily life scenes have the highest priority.

A specific example will be described. Assume a case when the image capture period is thirty-six hours, the number of images captured is three hundred, and the number of people captured in the images is 1.7 for a sub image group (5) in FIG. 6A, obtained by the scene division. The mean score, calculated from equations (1) and (2) above, is 45.32 for a trip scene, 18.38 for a daily life scene, and −29.92 for a ceremony scene. Thus, the scene type of the sub image group (5) is classified as a trip scene. The image classification unit 205 manages the classified scene (sub image group) with a scene ID given thereto so that the classified scene (sub image group) can be identified.

In S409, it is determined whether the scene type classification in S408 has been finished for all scenes divided in S407. If it is determined that the classification has not been finished for all, the processes from S408 are repeated. If it is determined that the classification has been finished for all, the flow proceeds to S410.

In S410, the image scoring unit 207 sets the main character. The image scoring unit 207 sets the main character by one of two setting methods, namely, an automatic setting method and a manual setting method. The image scoring unit 207 can obtain the number of times each personal ID appears in the group of image data, the number of times the personal ID appears in each scene, the number of scenes in which the personal ID appears, and the like, from the result of the personal recognition executed in S404 and the result of the scene division executed in S407. Using these obtained pieces of information, the image scoring unit 207 can automatically set the main character without the user's designation.

On the other hand, in a case when the user has designated a main character designation icon, the user information input unit 206 notifies the image scoring unit 207 of the designated personal ID. In a case when the user has designated a personal ID, the image scoring unit 207 sets the personal ID designated by the user as a main character ID. This setting is referred to as a manual setting.

In S411, the image scoring unit 207 sets a priority mode. Similarly to the setting of the main character, the image scoring unit 207 sets a priority mode by one of two setting methods, namely, an automatic setting method and a manual setting method. The image scoring unit 207 can obtain the number of times each type of object appears in the group of image data, the number of times the type of object appears in each scene, the number of scenes in which the type of object appears, and the like, from the result of the object recognition executed in S405. Using these obtained pieces of information, the image scoring unit 207 can automatically set a priority mode without the user's designation. Alternatively, similarly to S410, manual setting is possible in which a priority mode designated by the user is set.

Figure 8A:
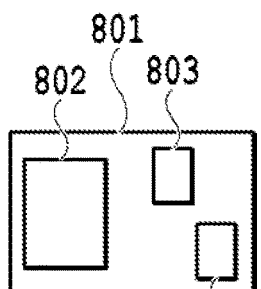
FIGS. 8A to 8Q are diagrams illustrating a group of templates for use in laying out pieces of image data.
Figure 8E:
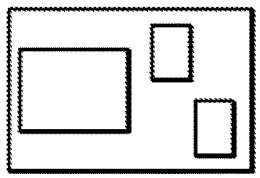
Figure 8I:
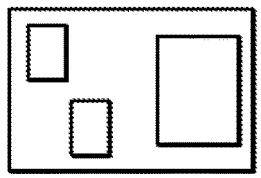
Figure 8M:
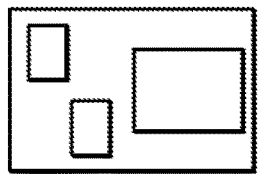
Figure 8B:
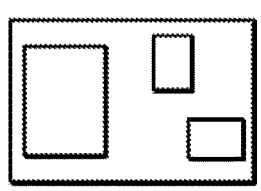
Figure 8F:
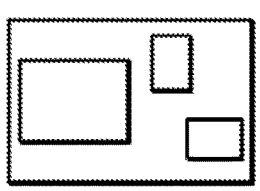
Figure 8J:
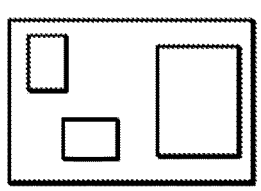
Figure 8N:
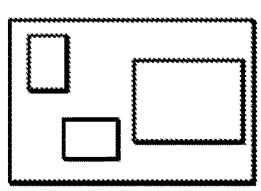
Figure 8C:
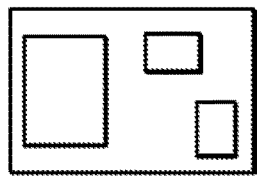
Figure 8G:
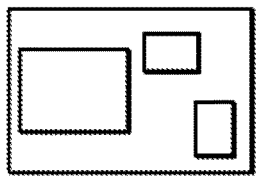
Figure 8K:
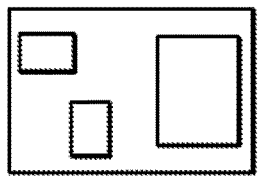
Figure 8O:
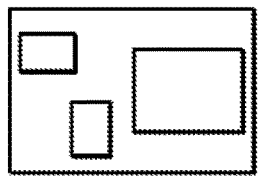
Figure 8D:
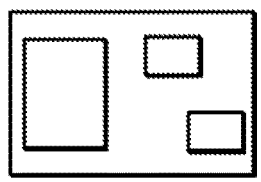
Figure 8H:
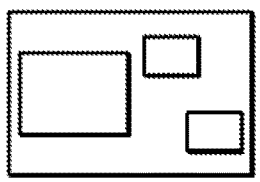
Figure 8L:
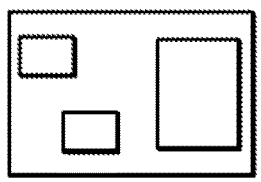
Figure 8P:
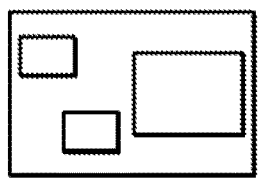
Figure 8Q:
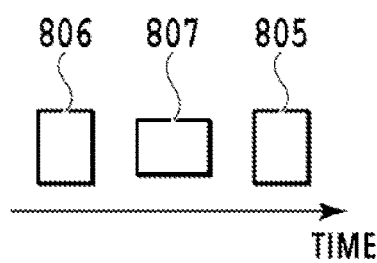

In S412, the image scoring unit 207 executes scoring. The scoring refers to giving scores based on evaluations from the later-described aspects to the images in the group of image data obtained by the image obtaining unit 202. The scores given to the images will be referred to in the selection of image data to be used in the layout. Meanwhile, the templates used in this embodiment each include a main slot and optionally one or more sub slots as slots in which to arrange an image. The main slot is larger in size than the sub slots. The image scoring unit 207 gives each image a score for main slot and a score for sub slot. FIGS. 8A to 8Q are diagrams explaining a group of templates for use in laying out pieces of image data. FIGS. 8A to 8P each represent a template. Each of the templates in FIGS. 8A to 8P includes three image slots (frames in which to lay an image out). In other words, FIGS. 8A to 8P are a group of three-image templates. Each template in the group of templates corresponds to a single double-page spread. A template 801 is a single template, and a slot 802 represents a main slot while slots 803 and 804 represent sub slots. The main slot 802 is a main slot in the template 801 and is larger in size than the sub slot 803 and the sub slot 804. The image scoring unit 207 gives each piece of image data both a score for a main slot and a score for a sub slot. Each template contains the number, widths, and heights of slots in which to arrange an image, the positions of the slots in a double spread, layer information indicating the order in which the slots are layered, and slot numbers for identifying the slots in the template.

FIGS. 9A and 9B are diagrams explaining an overview of the scoring. FIG. 9A is a diagram illustrating features of images to be used in an album for each of the scene types of trip, daily life, and ceremony. The feature of main slot images and the feature of sub slot images are specified for each scene type. This embodiment assumes that, similarly to the instance of the scene type classification described above, the user has in advance designated pieces of image data each of which the user has determined to have a feature suitable for a main slot or a feature suitable for a sub slot for each scene type. For example, prior to the execution of the layout process in FIG. 4, the album creation condition designation unit 201 receives designation of pieces of image data that the user has determined to be suitable for a main slot (or a sub slot) for a trip scene on a UI screen (not illustrated). The image analysis unit 204 obtains feature amounts, namely, the number of faces, the face positions, and the face size, in each designated piece of image data. As a result, the image analysis unit 204 obtains the feature amounts, namely, the number of faces, the face positions, and the face size, in each piece of image data that the user has determined to be suitable for a main slot (or a sub slot) for a trip scene, for example. Then, the image analysis unit 204 calculates the mean and standard deviation of the numbers of faces, the mean and standard deviation of the face positions, and the mean and standard deviation of the face sizes. The image analysis unit 204 calculates the mean and standard deviation of each feature amount as its statistical values as described above for each scene type and each slot type (main slot and sub slot). The image analysis unit 204 stores these values in a storage region, such as the ROM 102, in advance. Alternatively, the values may be incorporated in the program of the album creation application in advance. FIG. 9A lists features reflecting the mean and standard deviation of the numbers of faces, the mean and standard deviation of the face positions, and the mean and standard deviation of the face sizes.

The image scoring unit 207 gives a high score to an image close to either of the features in FIG. 9A under the scene type of its sub image group. The image scoring unit 207 can obtain the scene type to which the sub image group belongs from the result of the scene type classification in S408. The image scoring unit 207 obtains the means and standard deviations of the number of faces, the face positions, and the face sizes for the scene type of the images in the processing target sub image group. Also, the image scoring unit 207 obtains the feature amounts, namely, the number of faces, the face position, and the face size, of the main character ID in the processing target image data. Then, using these obtained pieces of information, the image scoring unit 207 calculates a mean score from equations (3) and (4).

$$\text{Score}=50-|10\times(\text{Mean}-\text{Feature Amount})/\text{Standard Deviation}| \quad \text{Equation (3)}$$

$$\text{Mean Score}=(\text{Score for Number of Faces}+\text{Score for Face Position}+\text{Score for Face Size})/\text{Number of Types of Feature Amounts} \quad \text{Equation (4)}$$

The image scoring unit 207 calculates both a mean score for main slot and a mean score for sub slot for each piece of image data obtained by the image obtaining unit 202. Note that, since images to be used in albums are preferably in focus, pieces of image data with image IDs whose focus amount in FIG. 5 is "GOOD" may be additionally given predetermined points. FIG. 9B illustrates an example of the result of the above scoring, in which image IDs are each scored for main slot and sub slot. For example, in FIG. 9B, an image ID 1 is given twenty points as an image for a main slot while an image ID 2 is given forty-five points as an image for main slot. In other words, this indicates that the image ID 2 is closer than the image ID 1 to the user's criteria for determining an image for a main slot.

Returning to the description with FIG. 4, in S413, the image scoring unit 207 determines whether the image scoring in S412 has been finished for all pieces of image data in the group of image data obtained by the image obtaining unit 202. If it is determined that the image scoring has not been finished for all, the processes from S412 are repeated. If it is determined that the image scoring has been finished for all, the flow proceeds to S414.

In this embodiment, a single template is used for a single double-page spread. Also, one of the divided scenes corresponds to a single double-page spread. For this reason, a process of matching the number of double-page spreads and the number of scenes (the number of sub image groups) is performed.

In S414, the double-page spread allocating unit 209 determines whether the number of divisions by the scene division in S407 is equal to the number of double-page spreads in the album inputted from the number-of-double-spreads input unit 208. If it is determined that the numbers are not equal, the flow proceeds to S415. If it is determined that the numbers are equal, the flow proceeds to S418. For example, if the number of divided scenes (the number of sub image groups) is eight, as illustrated in FIG. 6A, and the number inputted from the number-of-double-spreads input unit 208 is "8", the flow proceeds to S418.

In S415, the double-page spread allocating unit 209 determines whether the number of divisions by the scene division (the number of sub image groups) in S407 is less than the number of double-page spreads inputted from the number-of-double-spreads input unit 208. If it is determined that the number of divisions is less than the number of double-page spreads, the flow proceeds to S416. For example, if the number of divided scenes is eight, as illustrated in FIG. 6A, and the number inputted from the number-of-double-spreads input unit 208 is "10", the flow proceeds to S416. If it is determined that the number of divisions is not less than (more than or equal to) the number of double-page spreads, the flow proceeds to S417.

Figure 6B:
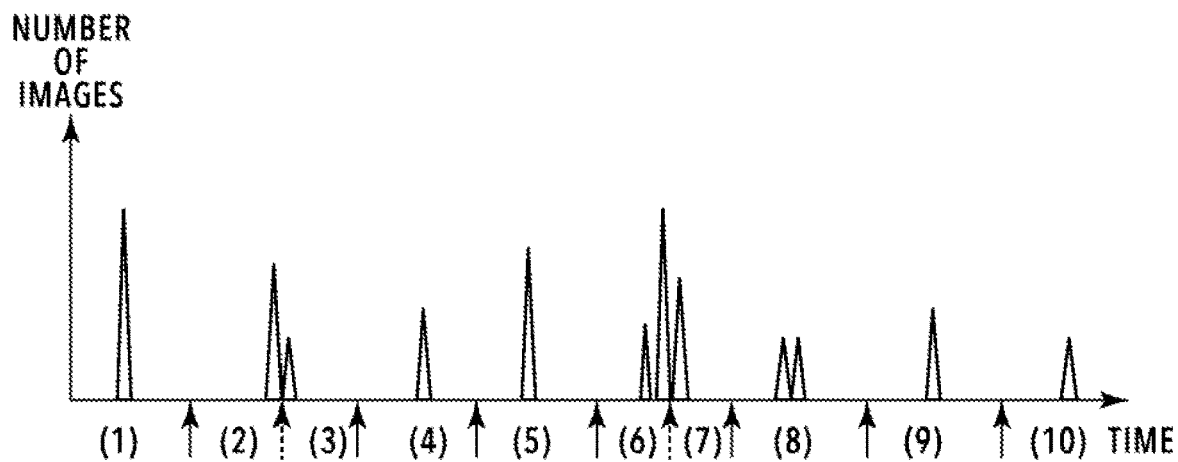

In S416, the double-page spread allocating unit 209 executes sub scene division. The sub scene division refers to further dividing one or more divided scenes. This will be described with a case when the number of divided scenes is eight, as illustrated in FIG. 6A, and the designated number of double-page spreads in the album is "10". FIG. 6B illustrates the result of performing the sub scene division on FIG. 6A. By the division at the positions of the dashed arrows, the number of divisions is changed to "10".

The criteria for the sub scene division will be described. Among the scenes in FIG. 6A, a search is conducted for divided sections (scenes) with large numbers of images. Here, two sections with large numbers of images are determined to increase the number of divisions by two from "8" to "10". In FIG. 6A, the section containing the largest number of images is the sub image group (5), followed by a sub image group (1) and a sub image group (2). While the number of images is the same between the sub image group (1) and the sub image group (2), the time interval between the first image and the last image is larger in the sub image group (2), and, thus, the double-page spread allocating unit 209 chooses the sub image group (2) as a section to be divided, and divides each of the sub image group (5) and the sub image group (2).

First, the division of the sub image group (2) will be described. The number of images in the sub image group (2) appears as two spikes and these two have different image capture dates. Thus, the sub image group (2) is divided at the position of the dashed arrow in FIG. 6B corresponding to that point. Next, the division of the sub image group (5) will be described. The number of images in the sub image group (5) appears as three spikes, representing three successive days. There are points at which the image capture date changes. To minimize the difference in the number of images after the division, the sub image group (5) is divided at the position of the other dashed arrow in FIG. 6B. The number of divisions is changed from eight to ten in the above manner. In the above example, the division is performed at points where the image capture date changes. However, in a case when there is only a single day with a section with a large number of images, the section may be divided at the point within the single day at which the time interval is the largest.

Figure 6C:
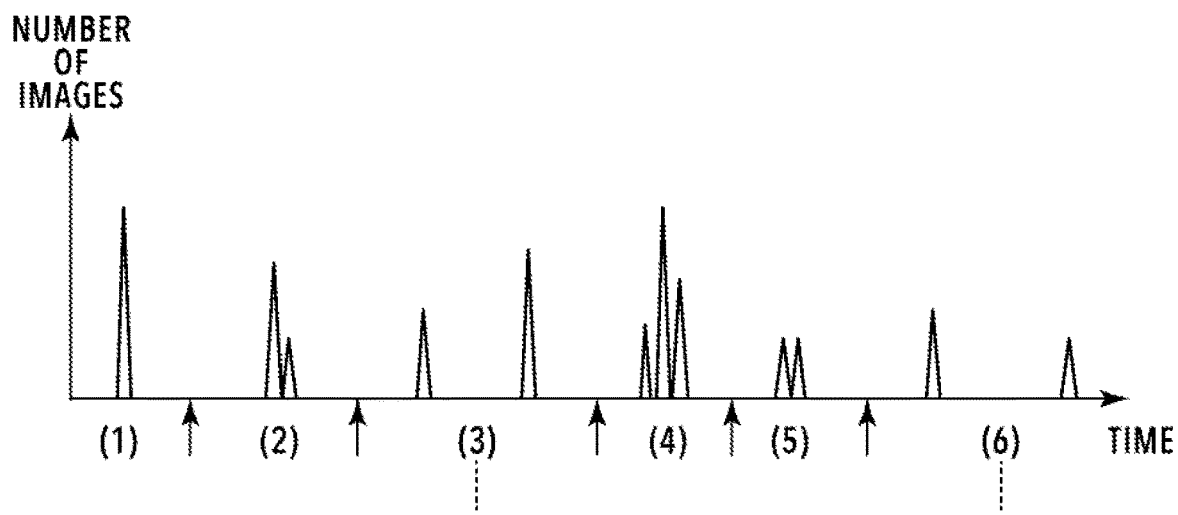

In S417, the double-page spread allocating unit 209 executes scene merge. The scene merge refers to merging divided scenes. FIG. 6C illustrates the result of performing the scene merge on FIG. 6A. By performing the merge at the positions of the dashed lines, the number of divisions is decreased to "6".

The criteria for the merge will be described. Among the divided sections in FIG. 6A, a search is conducted for sections with small numbers of images. Here, two fragments with small numbers of images are determined to decrease the number of divisions by two from "8" to "6". In FIG. 6A, the sub image groups containing the smallest number of images is a sub image group (8), followed by a sub image group (3) and a sub image group (7). While the number of images is the same between the sub image group (3) and the sub image group (7), the sub image group (3) is determined as a merge target since the sub image group (8), which is next to the sub image group (7), is a merge target. As a result, each of the sub image group (8) and the sub image group (3) is merged.

First, the merge of the sub image group (3) will be described. As compared to the time interval between the sub image group (3) and the preceding sub image group (2), the time interval between the sub image group (3) and a following sub image group (4) is small. Thus, as indicated by one of the dashed lines in FIG. 6C, the sub image group (3) is merged with the sub image group (4). Next, the merge of the sub image group (8) will be described. Since there is no sub image group following the sub image group (8), the sub image group (8) is merged with the preceding sub image group (7), as indicated by the other dashed line in FIG. 6C.

In S418, the double-page spread allocating unit 209 executes double-spread allocation. By S414 to S417, the number of divided scenes and the designated number of double-page spreads are equal. The double-page spread allocating unit 209 sequentially allocates the scenes to respective double-page spreads in order of image capture date and time starting from the first divided scene.

In S419, the image selection unit 210 selects images. Specifically, from the sub image group of each scene, the image selection unit 210 selects as many images as the number of images to be used set for the corresponding double-page spread. The image selection unit 210 selects as many images as the number of images to be used from the sub image group in descending order of score, for example.

An example of selecting four images from the sub image group allocated to a double-page spread will be described below with reference to FIGS. 10A to 10I.

The section from "Start" to "End" illustrated in FIG. 10A represents the time interval between the image capture dates and times of the first and last images in the sub image group allocated to the double-page spread. A method of selecting the first image will be described with reference to FIG. 10B. Here, it is assumed that each template contained in the group of four-image templates contains a single main slot. In this case, an image for the main slot is selected as the first image. Among the plurality of images within the image capture period illustrated in FIG. 10B, the image with the highest score for main slot, given in S412, is selected as the first image. The second and subsequent images are selected as images for the sub slots.

In this embodiment, the image selection is performed so as to avoid selecting images locally from a part of the image capture period. As illustrated in FIG. 10C, the image capture period is divided into two periods. Then, as illustrated in FIG. 10D, the second image is selected from the image capture period with the solid line, from which the first image was not selected. Among the plurality of images within the image capture period with the solid line in FIG. 10D, the image with the highest score for sub slot is selected as the second image.

Then, as illustrated in FIG. 10E, each divided image capture period in FIG. 10D is divided into two periods. Thereafter, as illustrated in FIG. 10F, among the plurality of images within the image capture periods with the solid lines, from which neither the first nor the second image was selected, the image with the highest score for sub slot is selected as the third image.

Using the selection of the fourth image as an example, a description will be given of a case when there is no image in an image capture period from which to select a piece of image data and, thus, no image can be selected therefrom. FIG. 10G illustrates an example when the image selection unit 210 attempts to select the fourth image from the image capture period with the hatched lines, from which no image has been selected, but there is no image data in the image capture period with the hatched lines. In this case, as illustrated in FIG. 10H, each divided image capture period, excluding the image capture period with the hatched lines, is divided into two periods. Then, as illustrated in FIG. 10I, among the plurality of images within the image capture periods with the solid lines, from which none of the first to third images was not selected, the image with the highest score for a sub slot is selected as the fourth image.

Referring back to FIG. 4 to resume the description, in S420, the image layout unit 212 determines the layout of the images. The image layout unit 212 obtains the group of templates for the number of images to be used in the processing target double-page spread. Then, from the obtained group of templates, the image layout unit 212 determines a template suitable for the images selected in S419 and lays the images out in accordance with the determined template. A specific example will be described. Assume a case when the number of images to be used in the processing target double-page spread is three. In this case, the image layout unit 212 determines the template to be used for the processing target double-page spread from the group of three-image templates. FIGS. 8A to 8P illustrate three-image templates and the number of slots in each template is "3". Here, the three images selected for the processing target double-page spread would appear as illustrated in FIG. 8Q if aligned in order of image capture date and time in a given direction (vertical or horizontal direction). Here, an image 805 is for the main slot and images 806 and 807 are for the sub slots.

In this embodiment, the older the image capture date and time of the image, the closer it is laid out to the upper left of the template, and the newer the image capture date and time of the image, the closer it is laid out to the lower right of the template. In FIG. 8Q, the image 805 for the main slot has the newest image capture date and time and is a portrait image. Thus, the templates in FIGS. 8I to 8L are candidate templates. Further, since the older image 806 for a sub slot is a portrait image and the newer image 807 for a sub slot is a landscape image, the template in FIG. 8J is determined as the most suitable template for the selected three pieces of image data, so that the layout is determined.

As described above, in the example of FIGS. 8A to 8Q, a template is determined from the group of templates on the basis of the orientation (i.e., an aspect ratio) of each image allocated to and selected for the processing target double-page spread and the image capture date and time of the image. Note that, in this embodiment, a process of selecting a varied template is performed, as will be described later. In the case of selecting a varied template, a method different from the example described with reference to FIG. 8A to 8Q is used to select the template and to determine the layout. The example in FIGS. 8A to 8Q is a template selection method, for example, for a double-page spread for which a varied template does not need to be selected, such as the first double-page spread. The process of selecting a varied template will be described later.

In S421, the image correction unit 214 executes image correction. The image correction unit 214 executes the image correction if the image correction condition inputted from the image correction condition input unit 213 is on. At least one of dodging correction (luminance correction), red-eye correction, and contrast correction is executed as the image correction, for example. The image correction unit 214 executes no image correction if the image correction condition inputted from the image correction condition input unit 213 is off. The image correction can be executed on image data whose size is converted such that it has twelve hundred pixels on each short side in the sRGB color space, for example.

In S422, the layout information output unit 215 generates layout information. The layout information output unit 215 lays out (arranges) the one or more pieces of image data subjected to the image correction in S421 into the one or more slots in the template determined in S420. In doing so, the layout information output unit 215 resizes the pieces of image data to be laid out in accordance with the size information on the respective slots and lays them out. The layout information output unit 215 then generates bitmap data of the template with the pieces of image data laid out thereon.

In S423, it is determined whether the processes in S419 to S422 have been performed on all double-page spreads. If it is determined that there are one or more double-page spreads yet to be processed, the processes from S419 are repeated. If it is determined that the processes have been finished for the all of double-page spreads, the layout process in FIG. 4 is terminated.

<Process of Determining Varied Layout>

Next, a description will be given of a process of determining a varied layout in the layout determination process in S420. In this embodiment, a varied template is used to make a varied layout.

Prior to a description of details of the process, a supplemental description will be given of an exemplary problem and of the fact that determining a varied template makes a varied layout. To make a varied layout, it is preferable, for example, to select a template not similar to the template used for a first double-page spread as the template for a second double-page spread. However, in a case when the template variations are limited, it may not be possible to make a varied layout for each double-page spread. For example, in a case when the number of images to be allocated to each double-page spread is small, the selectable template variations are limited. Then, if the similarity is determined always with the same determination criteria, it may not be possible to automatically select a template not similar to the template used for the first double-page spread. This may result in a failure to make a varied layout for each double-page spread. In creating a photo album, in a case when the templates used for double-page spreads are uniform, the album created is monotonous and repetitive. It is preferable, for example, to determine the template to be used for a layout of a second double-page spread from among templates excluding any template similar to the template used for layout of a first double-page spread already created. Thus, in the layout determination process, the similarity between a template already used and a candidate template contained in a group of candidate templates is determined. However, in a case when the template variations are small (e.g., less than a predetermined number), a suitable template may not be selected if the similarity is determined using the same determination criteria as used in cases when the variations are large (e.g., more than or equal to the predetermined number). This will be described below.

In a case when the number of images to be used for a double-page spread is a predetermined number (e.g., two) or more, the template variations increase in proportion to the number of images. The condition for determining the similarity between templates in such a case will be referred to as a first determination condition. With the first determination condition, the similarity between templates is determined on the basis of, for example, the aspect ratios of the images in the templates with the relative positions of these images taken into account. In sum, whether templates are similar can be determined on the basis of whether the aspect ratios of the image slots in the templates are similar. The template for a second double-page spread, following a first double-page spread, is determined from among templates excluding any template determined to have a similar aspect ratio. In this way, a varied layout is achieved.

On the other hand, there are cases when the template variations are limited. For example, there is case when the number of images allocated to the processing target double-page spread is one.

FIGS. 11A to 11D are diagrams illustrating an example of the group of one-image templates. The group of one-image templates has a smaller number of templates than the group of three-image templates described with reference to FIGS. 8A to 8Q. The smaller the number of image slots, the lower the degree of freedom in template design and, therefore, the smaller the number of templates. Note that the templates in FIGS. 8A to 8P and FIGS. 11A to 11D are examples, and the numbers of templates are not limited to the illustrated numbers.

In FIGS. 11A to 11D, the slots for arranging a portrait image, for example, are only a slot 1111 in a template 1110 and a slot 1121 in a template 1120. In a case when a first double-page spread with an image already laid out thereon has used the template 1110, determining the template similarity with the same determination condition as the first determination condition will result in a determination that the templates 1110 and 1120, whose image slots have the same aspect ratio, are similar. As a result, the templates 1110 and 1120 are excluded and the remaining templates are candidate templates, and the template for the processing target double-page spread is determined from among these candidate templates. However, in the case when the image allocated to the processing target double-page spread is a portrait image, templates 1130 and 1140 will also be excluded. Consequently, there is no usable template, which may be determined as an error, and the layout process may be terminated.

Thus, in this embodiment, in the case when the template variations are limited, the similarity determination process is performed not with the first determination condition, but with a second determination condition for determining the similarity more specifically than the first determination condition. The second determination condition is, for example, a condition with more determination items than the first determination condition. Specifically, whether the main slot positions coincide with each other is added as a determination item. Then, if similarity is acknowledged under both determination items, the two templates are determined to be similar. In other words, if similarity is not acknowledged under any one of the determination items, the two templates are determined to not to be similar. Specifically, the two templates are not determined to be similar if their main slots are the same in aspect ratio, but different in position. Here, a description will be given of an example of the result obtained by determining the similarity with the second determination condition, which is for determining the similarity more specifically than the first determination condition. Assume, for example, that the template used for the immediately preceding double spread is FIG. 8A. The number of templates that can be determined to be similar to FIG. 8A among the group of templates in FIGS. 8A to 8P by using the first determination condition is greater than the number of templates that can be determined to be similar to FIG. 8A by using the second determination condition.

Using this second determination condition allows the template 1120 to avoid being determined to be similar to the template 1110. As a result, even in the case when the template 1110 has been used for a first double-page spread, the template 1120 will be used as a second double-page spread, so that varied layouts are obtained. Details will be described later.

Note that in a case when there are many template variations (e.g., the number of image slots is two or more), varied layouts can be created by determining the similarity with the first determination condition than with the second determination condition. With the second determination condition, two templates are determined to be similar only if similarity is acknowledged under both determination items. In other words, the determination criteria for two images to be determined to be similar are stricter and the number of excluded templates is smaller accordingly. Consequently, the templates that would be determined as similar templates with the first determination condition are not excluded and remain as candidate templates, and any of these templates may be selected. In this case, the two templates are not uniform, but the degree of variedness between them is low.

With the above points taken into consideration, in this embodiment, a process is performed in which the determination condition to be used in the similarity determination is changed in accordance with the number of images allocated to the processing target double-page spread.

<Flowchart>

Figure 12:
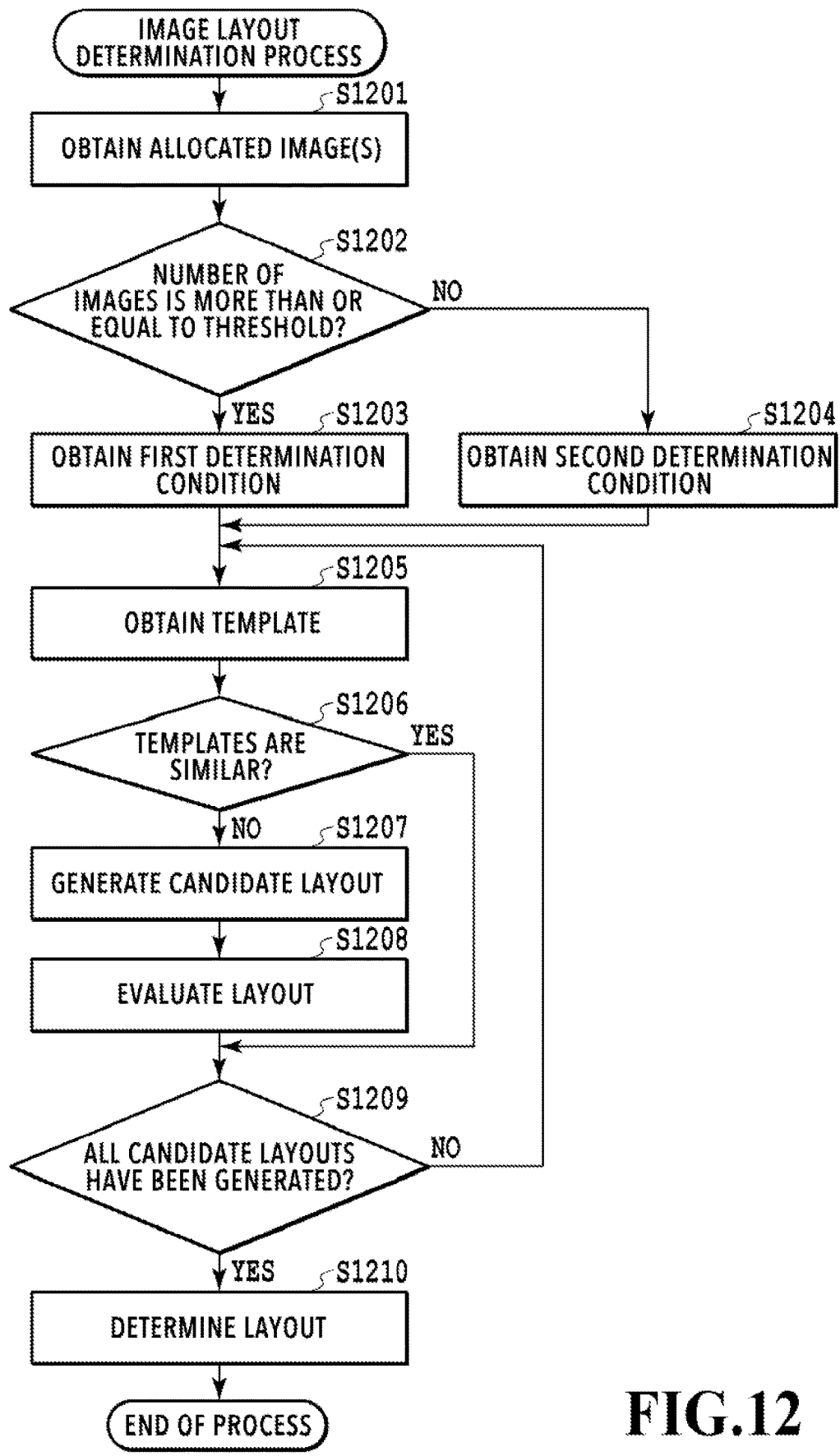
FIG. 12 is a flowchart of a layout determination process.

Details of the image layout determination process in S420 will be described below. FIG. 12 is a flowchart illustrating the image layout determination process by the image layout unit 212 of the album creation application in this embodiment. Note that, as described earlier, the image layout unit 212 may determine a layout by a method as described with reference to FIGS. 8A to 8Q in the case of determining the layout without taking into account the similarity to any layout already used. FIG. 12 is a process performed for each processing target double-page spread. Note that, in this embodiment, as mentioned above, the template for the first double spread is determined from a group of templates on the basis of the orientation (i.e., aspect ratio) of the one or more images allocated to and selected for the processing target double-page spread and the image capture date and time of the one or more images. On the other hand, FIG. 12 is executed to select the templates to be used for the subsequent double spreads.

In S1201, the image layout unit 212 obtains the one or more images selected in S419 for the processing target double-page spread. In other words, the image layout unit 212 obtains the one or more images allocated to the processing target double-page spread (more specifically, as many images as the number of images to be used for the double-page spread). Here, the images allocated by the double-page spread allocating unit 209 and selected by the image selection unit 210 will be collectively referred to as "images allocated to the double-page spread".

In S1202, the image layout unit 212 determines whether or not the number of images obtained in S1201 is more than or equal to a first threshold. The first threshold is "2", for example. If the number of images is more than or equal to the first threshold, the flow proceeds to S1203. Otherwise, the flow proceeds to S1204.

In S1203, the image layout unit 212 obtains the first determination condition as the determination condition for determining the similarity. On the other hand, in S1204, the image layout unit 212 obtains the second determination condition, which is a more specific determination condition than the first determination condition, as the determination condition for determining the similarity.

In S1205, the image layout unit 212 obtains a candidate template from the group of templates inputted by the template input unit 211. The candidate template is a template that has not been subjected to the similarity determination in S1206 to be described next. Specifically, in S1205, the image layout unit 212 obtains a template that has not been subjected to the similarity determination process from the group of templates for the number of images obtained in S1201.

In S1206, the image layout unit 212 determines whether the template obtained in S1205 is similar to the template used for another double-page spread. In doing so, the image layout unit 212 determines the similarity by using the first determination condition, obtained in S1203, or the second determination condition, obtained in S1204. In this embodiment, the image layout unit 212 calculates the degree of similarity between the template obtained in S1205 and the template used for layout of the double-page spread immediately preceding the processing target double-page spread. Note that the template to be subject to the determination of the degree of similarity to the candidate template is not limited to the template used for layout of the immediately preceding double-page spread. For example, it is possible to employ a mode in which the candidate template is compared with a template already used for a double-page spread and designed for the same number of images as the candidate template. Alternatively, it is possible to employ a mode in which the candidate template is compared with a template already used for a double-page spread and designed for a different number of images from the candidate template.

The similarity determination using the first determination condition will be described below. With the first determination condition, the degree of similarity between two templates is calculated, for example, as the distance between vectors defined by the aspect ratios of the slots in the templates with their relative positions taken into account. In a case when the height of a slot is four and the width of the slot is three, the aspect ratio of the slot is 4/3. Then, a vector indicated by the template in FIG. 8A, for example, can be expressed as below.

$$\left[\frac{4}{3} \quad \frac{4}{3} \quad \frac{4}{3}\right]$$

Also, a vector indicated by the template in FIG. 8B can be expressed as below.

$$\left[\frac{4}{3} \quad \frac{4}{3} \quad \frac{3}{4}\right]$$

Further, the distance between the vector of the template in FIG. 8A and the vector of the template in FIG. 8B can be expressed as below.

$$\sqrt{\left|\frac{4}{3}-\frac{4}{3}\right|^2 + \left|\frac{4}{3}-\frac{4}{3}\right|^2 + \left|\frac{4}{3}-\frac{3}{4}\right|^2}$$

The degree of similarity is 0.58. The closer the numerical value of the degree of similarity is to zero, the more the templates resemble each other. Conversely, the higher the numerical value, the less the templates resemble each other. In a case when a threshold for the degree of similarity is 0.3, the template in FIG. 8A and the template in FIG. 8B are determined to be not similar. Although the threshold for the degree of similarity here is 0.3, the value is not limited to this example as long as it can determine whether templates are similar.

Next, the similarity determination using the second determination condition will be described. With the second determination condition, the similarity is determined using the degree of similarity based on the aspect ratio of each slot and, in addition, the position of the main slot in each template, for example. This will be described with the example of FIGS. 11A to 11D. In a case when the template 1110 in FIG. 11A has been used for layout of the immediately preceding double-page spread, the degree of similarity of each of the templates in FIGS. 11A to 11D based on the aspect ratio of the slot is as follows: the template 1110 in FIG. 11A has a degree of similarity of 0.0; the template 1120 in FIG. 11B has a degree of similarity of 0.0; the template 1130 in FIG. 11C has a degree of similarity of 0.58; and the template 1140 in FIG. 11D has a degree of similarity of 0.58.

Then, the similarity of the position of the main slot is determined. The position of the main slot is left in the template 1110 in FIG. 11A, right in the template 1120 in FIG. 11B, left in the template 1130 in FIG. 11C, and right in the template 1140 in FIG. 11D.

Figure 11A:
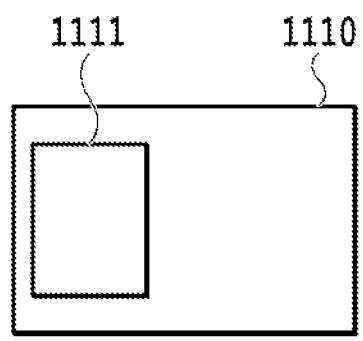
FIGS. 11A to 11D are diagrams illustrating a group of templates for use in laying out a piece of image data.
Figure 11B:
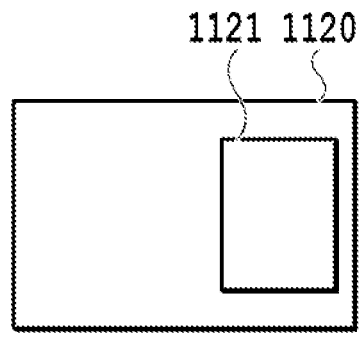
Figure 11C:
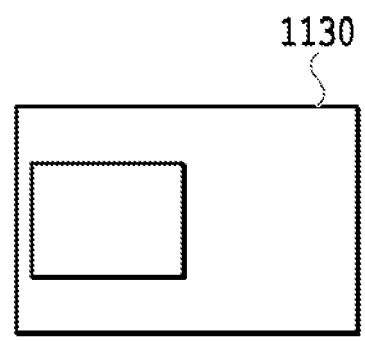
Figure 11D:
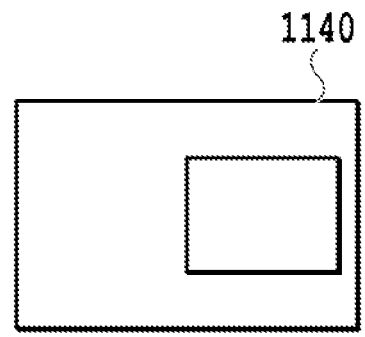

With the second determination condition, templates are determined to be similar in a case when the degree of similarity based on the aspect ratios of the slots is lower than or equal to a threshold of 0.3 and also the positions of the main slots coincide with each other. Specifically, in the case when the template 1110 in FIG. 11A has been used for layout of the immediately preceding double-page spread, the template 1110 in FIG. 11A is determined as a similar template. On the other hand, the template 1120 in FIG. 11B, the template 1130 in FIG. 11C, and the template 1140 in FIG. 11D are determined as dissimilar templates.

If the template obtained in S1205 is determined in S1206 to be not similar to the template used for layout of the immediately preceding double-page spread, the flow proceeds to S1207. Otherwise (the templates are determined to be similar), the flow proceeds to S1209, skipping the processes in S1207 and S1208. In other words, the candidate template, obtained in S1205, is excluded as a template for the processing target double-page spread.

In S1207, the image layout unit 212 lays out the one or more images obtained in S1201 by using the template obtained in S1205 and determined as a dissimilar template in S1206 (hereafter also referred to as "to-be-used template"). The layout process may be performed through a procedure similar to the above-described process in S420, and description thereof is omitted here. By this process, a candidate layout is generated, which is the template obtained in S1205 and determined as a dissimilar template in S1206 with the images laid out thereon.

In S1208, the image layout unit 212 evaluates the candidate layout. In this embodiment, as will be described later, evaluation values of a plurality of candidate layouts are determined, and the candidate layout with the highest evaluation value is determined as the layout of the processing target double-page spread. For this reason, in S1208, the image layout unit 212 calculates the evaluation value of the candidate layout. Any method can be used as the method of calculating the evaluation value of the candidate layout. For example, the score of the image allocated to the main slot can be calculated as the layout's evaluation value. In the case of using, for example, a template for a single portrait image among the template 1120 in FIG. 11B, the template 1130 in FIG. 11C, and the template 1140 in FIG. 11D, using the template 1120 gives the highest evaluation score. A portrait image cannot be laid out on the template 1130 in FIG. 11C or the template 1140 in FIG. 11D, each of which has a landscape main slot. Hence, they are given no evaluation value or an evaluation value less than or equal to a predetermined value. Note that, in a case when a score based on the aspect ratio has been calculated for each image as its score, the evaluation value may be calculated using the score based on the aspect ratio, though not illustrated in FIGS. 8A to 8Q.

In S1209, the image layout unit 212 determines whether all candidate layouts have been generated. Specifically, the image layout unit 212 determines whether the processes in S1205 to S1208 have been finished for all candidate templates. If the processes have been finished for all, the flow proceeds to S1210. If the processes have not been finished for all, the processes from S1205 are repeated. In S1205, a candidate template yet to be processed is obtained.

In S1210, the image layout unit 212 determines the layout from among the candidate layouts. In this embodiment, the image layout unit 212 selects the candidate layout with the highest layout evaluation value among the evaluation values calculated in S1208. Here, the template used for the candidate layout with the highest evaluation value may be referred to as a "to-be-used template". Moreover, the image layout unit 212 stores the number of the template used for the selected layout to store information indicating the template has already been used. The number of the used template may be stored in association with the page number of the double-page spread.

As described above, in this embodiment, the determination condition for determining the similarity between templates is changed in accordance with the number of images. In this way, similar templates are prevented from being selected successively. In other words, a layout result with varied double-page spreads is provided. Thus, in this embodiment, the similarity between templates is properly determined, so that a varied layout result is provided.

Note that, in another example of this embodiment, the first determination condition may only use the degree of similarity based on the aspect ratio of each slot, and the second determination condition may only use the position of each main slot.

Embodiment 2

Embodiment 1 has been described taking as an example a mode in which the determination condition for determining the similarity is changed in accordance with the number of images allocated to the processing target double-page spread. In this embodiment, a description will be given of a mode in which the determination condition for determining the similarity is changed in accordance with the number of usable templates. The configuration of the image processing apparatus in this embodiment is similar to that described in embodiment 1, and description thereof is therefore omitted.

Figure 13:
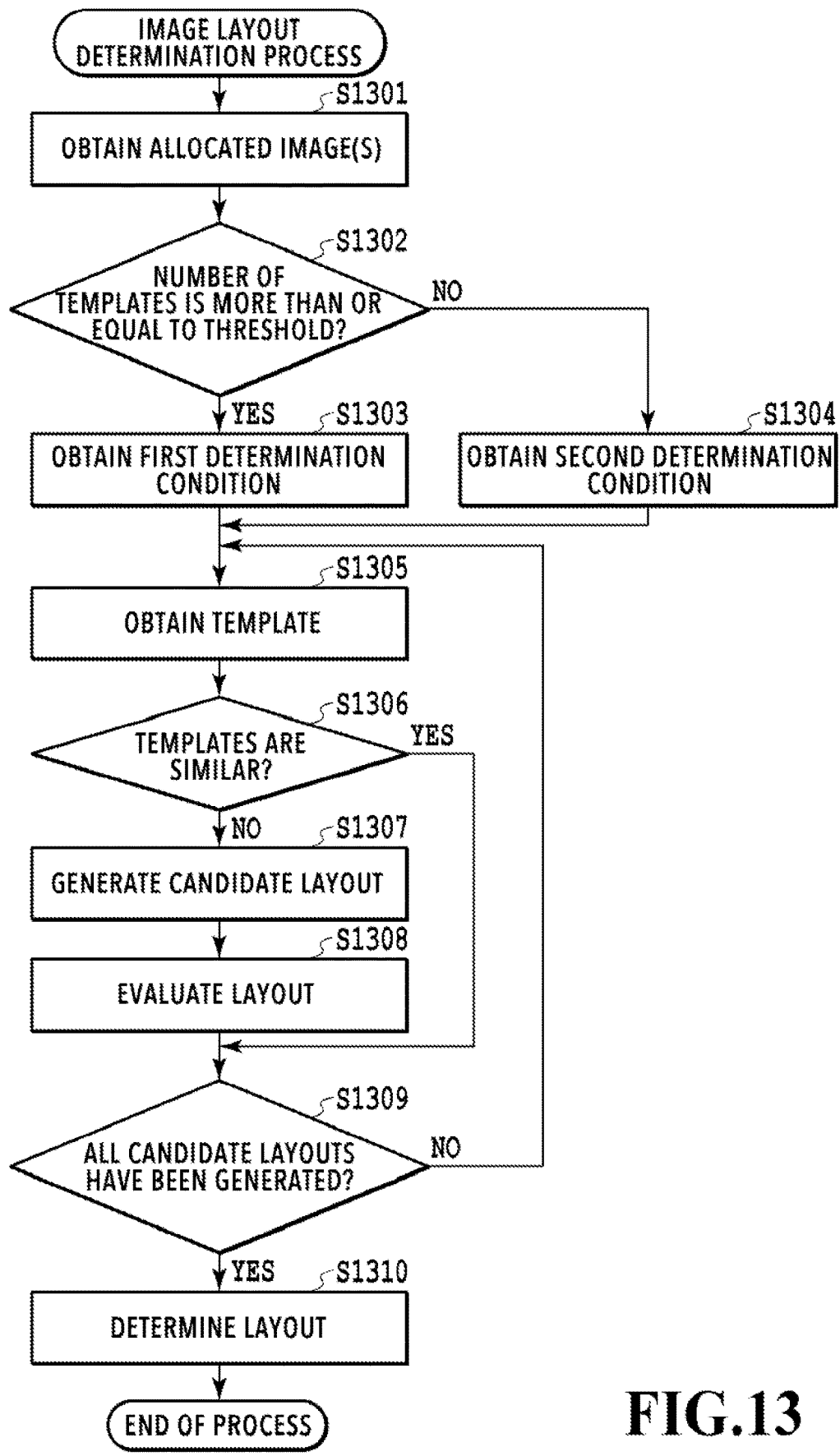
FIG. 13 is a flowchart of a layout determination process.

FIG. 13 is a flowchart illustrating an example of an image layout process in S420 in this embodiment. S1302 is the difference from FIG. 12. The processes in the other steps, namely S1301 and S1302 to S1310, are similar to the processes in S1201 and S1202 to S1210, and a description thereof is therefore omitted.

In S1302, the image layout unit 212 determines whether the number of templates is equal to or more than a second threshold (e.g., "5"). There are cases when the number of usable candidate templates for the processing target double-page spread is small, such as a case when the group of templates prepared in advance has been sub-divided by design type. As described in embodiment 1, having a small number of images is equivalent to having a small number of template variations. Also, in a case when the number of candidate templates is small in the first place, the number of template variations is small as well. Thus, in this embodiment, the determination condition for determining the similarity is changed, as in embodiment 1, in the case when the number of templates is small. The second threshold has been described as five as an example and is not limited to this value.

As described above, according to this embodiment, the similarity is determined more specifically even in the case when the number of templates is small. Hence, the similarity between templates is properly determined, so that a varied layout result is provided.

Other Embodiments

Embodiments 1 and 2 have been described taking, as an example, modes in which the degree of similarity between templates is calculated using the aspect ratio of each slot and the position of each main slot. Specifically, the description has been given of modes in which the first determination condition only uses the aspect ratio of each slot and the second determination condition uses the aspect ratio of each slot and the position of each main slot. However, the determination of the degree of similarity is not limited to this method. It suffices that information indicating a state of each template be used, and the degree of similarity between templates may be calculated from a numerical value such as the number of slots, the sizes of the slots, the order in which the slots are arranged, the coordinate positions of the slots, the number of slots coinciding with each other in position, and the number of slots joined. Also, as for the number of determination items, it suffices that the second determination condition have more determination items than the first determination condition, and the number of determination items in the first determination condition may not be one.

Also, the description has been given of modes in which the determination condition is switched between the two determination conditions, namely, the first determination condition and the second determination condition. However, the switching of the determination condition is not limited to this manner. It suffices that the determination condition be changed in accordance with the number of images. For example, it is also possible to employ a mode using a first determination condition, a second determination condition, and a third determination condition for performing an intermediate level of determination between them.

Also, the determination condition may be changed in a situation where a layout problem may possibly occur, instead of a situation where similar templates may possibly be used. For example, the determination condition may be changed in a case when the one or more images laid out cannot withstand printing and their resolution will, therefore, be low or in a case when any face detected in S403 is positioned over the binding part of the double spread. In sum, a condition for excluding any template causing such a layout may be provided, or a determination item for determining similarity to any template causing such layout may be provided. Alternatively, the evaluation value of any layout that may possibly cause a problem as above may be determined low in S1208 to practically exclude the layout as a candidate layout.

Figure 14:
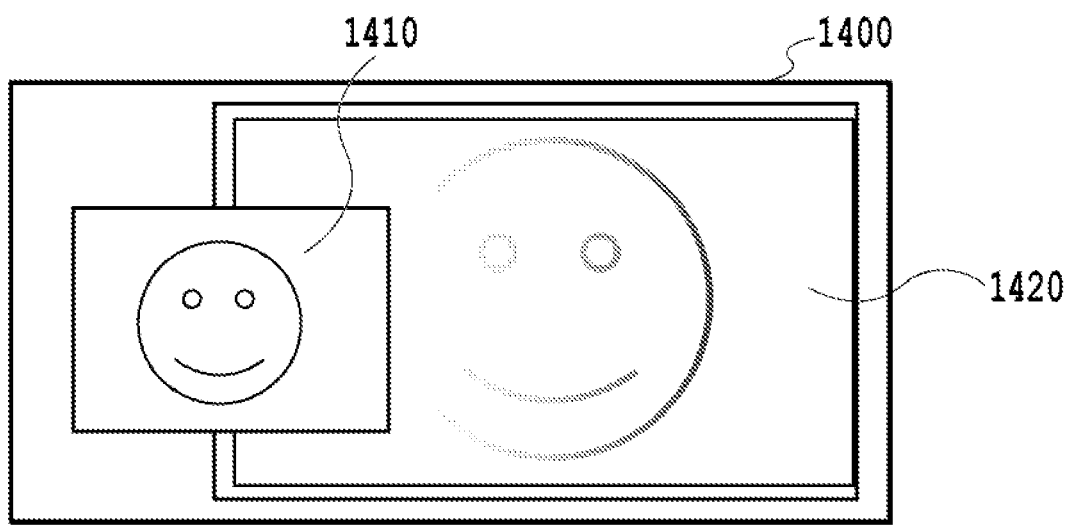
FIG. 14 is a diagram explaining photo-on-photo.

Also, the determination condition may be changed in a case when there is a template that is a similar template, but should be preferentially used, instead of avoiding using the similar template. For example, the determination condition may be changed in a case when it is preferable to use a template of a different design such as photo-on-photo, in which photos laid out one over the other. In other words, it is possible to use a determination condition that does not exclude this photo-on-photo template even in a case when it is a similar template. Here, the photo-on-photo will be described. For example, a double-page spread 1400 in FIG. 14 is a diagram in which an image 1410 is arranged in a slot and a background image 1420 is arranged in the background. The background image 1420 has been subjected to a blurring process. The reason for performing image processing only on the background image 1420 as mentioned will be described. The background image 1420 is obtained by enlarging the image 1410. This enlargement lowers the resolution of the image and forms jaggies, which make visible the pixels of the object's contour in the image. For this reason, the image subjected to a blurring process as image processing for avoiding such jaggies is used as the background image. Note that, any image processing may be used as long as it makes jaggies visually unrecognizable. For example, it is possible to employ a transparency process, a gradient mask process, a line art process, a halftone process, or the like.

Also, in the above embodiments, a description has been given of examples when, in determining the template for the processing target double-page spread, the degree of similarity to the template used for the immediately preceding double-page spread is calculated. Specifically, a description has been given of examples when the similarity between templates for two successive double-page spreads is determined. However, the double-page spreads are not limited to two successive double-page spreads. For example, it is possible to determine the similarity to the templates used for all double-page spreads already subjected to the layout process. Alternatively, it is possible to determine the similarity to double-page spreads appearing at predetermined intervals, such as even-numbered double-page spreads or odd-numbered double-page spreads.

Also, in the above embodiments, the description has been given of examples when, in a case when a candidate template is determined as a similar template, the candidate layout is prevented from being used by not generating its candidate layout. However, the present invention is not limited to this approach. For example, in the case when a candidate template is determined as a similar template, its layout evaluation value, calculated in S1208, may be reduced. In this way, the layout using the similar candidate template is unlikely to be used in the process in S1210. Alternatively, in the case when a candidate template is determined as a similar template, the image layout unit 212 may obtain a template from a group of templates of a different design in S1205. In this way, it is possible to avoid a similar template.

Further, in the case when a candidate template is determined as a similar template, one or more images may be reselected on the basis of a different selection criteria from those used in the image section in S419, irrespective of the number of images, the aspect ratio, whether the one or more images were obtained automatically or manually designated, and so on. Specifically, it is possible to avoid a similar template also by changing the group of image data entirely or partly to a different group of image data. It is possible to avoid a similar template also by reallocating images to double-page spreads on the basis of different criteria from those for the double-page spread allocation in S418.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be pro- While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to properly determine the similarity between templates and, thus, provide a varied layout result.

What is claimed is:

1. An image processing apparatus comprising:
   an obtaining unit configured to obtain a plurality of images;
   an allocating unit configured to allocate at least one image to each of double-page spreads out of the obtained images;
   a first determination unit configured to determine a group of candidate templates usable for a processing target double-page spread in accordance with the number of images allocated to the processing target double-page spread;
   a second determination unit configured to determine a determination condition for determining whether a template already used for layout and a template included in the determined group of candidate templates are similar, on a basis of the number of images allocated to the processing target double-page spread or the number of templates included in the determined group of candidate templates;
   a third determination unit configured to determine a to-be-used template to be used for the processing target double-page spread from among the templates included in the group of candidate templates and excluding any template determined to be a similar template with the determination condition; and
   a layout unit configured to lay out the at least one image allocated to the processing target double-page spread on the to-be-used template.

2. The image processing apparatus according to claim 1, wherein the second determination unit determines (i) a first determination condition as the determination condition in a case when the number of images allocated to the processing target double-page spread is equal to or more than a first threshold, and (ii) a second determination condition for determining similarity more specifically than the first determination condition as the determination condition in a case when the number of images allocated to the processing target double-page spread is fewer than the first threshold.

3. The image processing apparatus according to claim 1, wherein the second determination unit determines (i) a first determination condition as the determination condition in a case when the number of templates included in the group of candidate templates, determined by the first determination unit, is equal to or more than a second threshold, and (ii) a second determination condition for determining similarity more specifically than the first determination condition as the determination condition in a case when the number of templates included in the group of candidate templates, determined by the first determination unit, is fewer than the second threshold.

4. The image processing apparatus according to claim 2, wherein the second determination condition includes a greater number of determination items than the first determination condition.

5. The image processing apparatus according to claim 2, wherein the first determination condition includes a determination item based on an aspect ratio of a slot in which to arrange the at least one image.

6. The image processing apparatus according to claim 5, wherein the second determination condition includes a determination item based on the aspect ratio and a determination item based on a position of the slot in which to arrange the at least one image.

7. An image processing method comprising:
   obtaining a plurality of images;
   allocating at least one image to each of double-page spreads out of the obtained images;
   determining a group of candidate templates usable for a processing target double-page spread in accordance with the number of images allocated to the processing target double-page spread;
   determining a determination condition for determining whether a template already used for layout and a template included in the determined group of candidate templates are similar, on a basis of the number of images allocated to the processing target double-page spread or the number of templates included in the determined group of candidate templates;
   determining a to-be-used template to be used for the processing target double-page spread from among the templates included in the group of candidate templates and excluding any template determined to be a similar template with the determination condition; and
   laying out the at least one image allocated to the processing target double-page spread on the to-be-used template.

8. The image processing method according to claim 7, wherein a first determination condition is determined to be the determination condition in a case when the number of images allocated to the processing target double-page spread is equal to or more than a first threshold, and a second determination condition for determining similarity more specifically than the first determination condition is determined to be the determination condition in a case when the number of images allocated to the processing target double-page spread is fewer than the first threshold.

9. The image processing method according to claim 7, wherein a first determination condition is determined to be the determination condition in a case when the number of templates included in the determined group of candidate templates is equal to or more than a second threshold, and a second determination condition for determining similarity more specifically than the first determination condition is determined to be the determination condition in a case when the number of templates included in the determined group of candidate templates is fewer than the second threshold.

10. The image processing method according to claim 8, wherein the second determination condition includes a greater number of determination items than the first determination condition.

11. The image processing method according to claim 8, wherein the first determination condition includes a determination item based on an aspect ratio of a slot in which to arrange the at least one image.

12. The image processing method according to claim 11, wherein the second determination condition includes a determination item based on the aspect ratio and a determination item based on a position of the slot in which to arrange the at least one image.

13. The image processing method according to claim 7, wherein the determination condition is used to determine whether a template already used for layout of a double-page spread immediately preceding the processing target double-page spread and a template included in the determined group of candidate templates are similar.

14. The image processing method according to claim 7, wherein the determination condition is used to determine whether a template already used for layout of a double-page spread separated from the processing target double-page spread by a predetermined interval and a template included in the determined group of candidate templates are similar.

15. The image processing method according to claim 7, further comprising:

determining an evaluation value of each of the candidate templates with the at least one image arranged thereon; and determining the template with the highest evaluation value as the to-be-used template.

16. The image processing method according to claim 15, wherein the evaluation value is determined for each of the candidate templates with the at least one image arranged thereon excluding any candidate template determined to be a similar template with the determination condition.

17. The image processing method according to claim 9, wherein the first determination condition includes a determination item based on an aspect ratio of a slot in which to arrange the at least one image.

18. The image processing method according to claim 17, wherein the second determination condition includes a determination item based on the aspect ratio and a determination item based on a position of the slot in which to arrange the at least one image.

19. A non-transitory computer readable storage medium storing a program that performs an image processing method, the image processing method comprising:

obtaining a plurality of images;

allocating at least one image to each of double-page spreads out of the obtained images;

determining a group of candidate templates usable for a processing target double-page spread in accordance with the number of images allocated to the processing target double-page spread;

determining a determination condition for determining whether a template already used for layout and a template included in the determined group of candidate templates are similar, on a basis of the number of images allocated to the processing target double-page spread or the number of templates included in the determined group of candidate templates;

determining a to-be-used template to be used for the processing target double-page spread from among the templates included in the group of candidate templates and excluding any template determined to be a similar template with the determination condition; and laying out the at least one image allocated to the processing target double-page spread on the to-be-used template.

* * * * *